US012511578B2

(12) United States Patent
Takeuchi

(10) Patent No.: US 12,511,578 B2
(45) Date of Patent: Dec. 30, 2025

(54) LEARNING DATA GENERATION SYSTEM, LEARNING DATA GENERATION METHOD, AND NON-TRANSITORY COMPUTER READABLE MEDIUM

(71) Applicant: NEC Corporation, Tokyo (JP)

(72) Inventor: Toshiki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 611 days.

(21) Appl. No.: 17/994,672

(22) Filed: Nov. 28, 2022

(65) Prior Publication Data
US 2023/0169401 A1 Jun. 1, 2023

(30) Foreign Application Priority Data
Nov. 30, 2021 (JP) ................................. 2021-194387

(51) Int. Cl.
*G06N 20/00* (2019.01)
*G06F 18/211* (2023.01)
*G06F 18/214* (2023.01)
*G06F 18/23213* (2023.01)

(52) U.S. Cl.
CPC .......... *G06N 20/00* (2019.01); *G06F 18/211* (2023.01); *G06F 18/214* (2023.01); *G06F 18/23213* (2023.01)

(58) Field of Classification Search
CPC ...... G06N 20/00; G06N 3/0895; G06N 3/091; G06F 18/211; G06F 18/214; G06F 18/23213; H04W 60/00
See application file for complete search history.

(56) References Cited

U.S. PATENT DOCUMENTS

| 11,630,996 B1* | 4/2023 | O'Shea | G06N 3/0455 |
| | | | 706/25 |
| 2019/0244132 A1* | 8/2019 | Ide | G06F 18/214 |
| 2021/0357808 A1 | 11/2021 | Tsuyuki | |
| 2022/0300824 A1* | 9/2022 | Shahid | H04W 48/16 |
| 2024/0373392 A1* | 11/2024 | Kudo | G01S 5/02 |

FOREIGN PATENT DOCUMENTS

| JP | 2020-173171 A | 10/2020 |
| JP | 2020-173172 A | 10/2020 |
| JP | 2021-179859 A | 11/2021 |
| WO | 2021/070248 A1 | 4/2021 |

OTHER PUBLICATIONS

JP Office Action for JP Application No. 2021-194387, mailed on Sep. 16, 2025 with English Translation.

* cited by examiner

*Primary Examiner* — Dave Misir
(74) *Attorney, Agent, or Firm* — Sughrue Mion, PLLC

(57) ABSTRACT

It is possible to improve recognition accuracy of an unknown transmission apparatus. A system inputs n pieces of first information (an unknown signal or a radio feature thereof), inputs the n pieces of first information to a supervised learning model that has been learned with respect to a known signal, and extracts n sample features. The system performs clustering processing on the n sample features. The system inputs m pieces of estimation target information to be estimated by an estimation apparatus that performs processing different from the clustering processing on the n unknown signals or radio features thereof, and acquires M pieces of estimation information. The system generates a relationship matrix indicating a relationship between a result classified into K groups by the clustering processing and the M pieces of estimation information.

19 Claims, 15 Drawing Sheets

| CL. No.<br>TEMPORARY LABEL | 0 | 1 | 2 | 3 | 4 | 5 | 6 | 7 |
|---|---|---|---|---|---|---|---|---|
| AAAA | 1500 | 0 | 0 | 0 | 0 | 0 | 0 | 0 |
| BBBB | 1500 | 0 | 0 | 0 | 0 | 0 | 0 | 0 |
| CCCC | 1500 | 0 | 0 | 0 | 0 | 0 | 0 | 0 |
| DDDD | 0 | 0 | 1498 | 0 | 0 | 0 | 0 | 0 |
| EEEE | 0 | 1500 | 0 | 0 | 0 | 0 | 0 | 0 |
| FFFF | 0 | 1500 | 0 | 0 | 0 | 0 | 0 | 0 |
| GGGG | 0 | 0 | 0 | 1491 | 0 | 0 | 0 | 0 |
| HHHH | 1500 | 0 | 0 | 0 | 0 | 0 | 0 | 0 |

Fig. 8

LEARNING DATA GENERATION SYSTEM, LEARNING DATA GENERATION METHOD, AND NON-TRANSITORY COMPUTER READABLE MEDIUM

INCORPORATION BY REFERENCE

This application is based upon and claims the benefit of priority from Japanese patent application No. 2021-194387, filed on Nov. 30, 2021, the disclosure of which is incorporated herein in its entirety by reference.

TECHNICAL FIELD

The present disclosure relates to a learning data generation system, a learning system, a learning data generation method, a learning method, and a program.

BACKGROUND ART

There has been proposed a technique for specifying a wireless terminal apparatus such as a portable terminal apparatus by recognizing based on a reception signal received from the wireless terminal apparatus. For the specification, it is basically necessary to register a feature of the reception signal in advance in association with the wireless terminal apparatus, and in such pre-registration, supervised machine learning may be used. Reception signals are usually different from each other even when the same wireless terminal apparatus is a radio wave source, depending on a receiving environment or the like, and may be received together with an unknown signal. However, by learning in consideration of the points as well, it is possible to improve recognition accuracy of a known wireless terminal apparatus.

Japanese Unexamined Patent Application Publication No. 2020-173171 and Japanese Unexamined Patent Application Publication No. 2020-173172 describe a radio wave specification learning apparatus learning in such a way that an unknown target (radio wave source) can be determined to be unknown.

The radio wave specification learning apparatus described in Japanese Unexamined Patent Application Publication No. 2020-173171 includes a radio wave specification input unit, a target information input unit, and a learning unit. The radio wave specification input unit inputs, for each of targets, a plurality of parameters derived by A/D-converting an electromagnetic wave coming from the target, or a radio wave specification having the plurality of parameters simulating the target. The target information input unit inputs, for each of the radio wave specifications, target information being information of the target determined to coincide with the radio wave specification. The learning unit learns a range of the radio wave specification to be determined to be coincident with the target, based on the radio wave specification being input from the radio wave specification input unit and the target information being input from the target information input unit. The learning unit learns that an identification target specification to be identified that deviates from the learned range is determined as an unknown specification in which the radio wave specification is unknown.

The radio wave specification learning apparatus described in Japanese Unexamined Patent Application Publication No. 2020-173172 includes a radio wave specification input unit, a matching degree information input unit, and a learning unit. The radio wave specification input unit inputs, for each of targets, a plurality of parameters derived by A/D-converting an electromagnetic wave coming from the target, or a radio wave specification having the plurality of parameters simulating the target. The matching degree information input unit inputs, for each of the radio wave specifications, matching degree information defining a parameter range of an identification target specification of an identification target to be determined to coincide with the radio wave specification. The learning unit learns a range of the identification target specification to be determined to be coincident with the radio wave specification, based on the radio wave specification being input from the radio wave specification input unit and the matching degree information being input from the matching degree information input unit. The learning unit learns that the identification target specification that deviates from the learned range is determined as an unknown specification in which the radio wave specification is unknown.

In addition, International Patent Publication No. WO2021/070248 describes a transmission apparatus recognition apparatus capable of automating template registration of an unregistered transmission apparatus, thereby improving efficiency of an operation of an operator. The transmission apparatus recognition apparatus described in International Patent Publication No. WO2021/070248 includes a receiving unit that receives a signal wirelessly transmitted from a transmission apparatus, a recognition unit, and a template feature registration unit. The recognition unit calculates a degree of similarity between a sample feature generated from a reception signal received by the receiving unit and a template feature registered in advance, compares the degree of similarity with a recognition threshold value, and thereby recognizes the transmission apparatus. The template feature registration unit generates a template feature from a sample feature for which recognition in the recognition unit has failed.

As described above, supervised machine learning (supervised learning) is sometimes used as a method of recognizing a wireless terminal apparatus being a transmission apparatus transmitting a wireless signal. In supervised learning, training data, that is, data with a correct answer label are necessary, and improvement in recognition accuracy can be expected by using a method such as data expansion or domain adaptation with respect to a transmission apparatus with a known signal, in other words, with respect to a known signal. The data expansion is a method of enhancing learning data by adding noise or environment information to a reception signal received from the same transmission apparatus in a pseudo manner, or the like. The domain adaptation is a kind of transition learning, and can refer to a learning method to be performed with a small amount of data. The domain adaptation is, for example, a method of acquiring a large number of signals in an environment A, and learning and updating only a part of a learning model by using the learned learning model and a small number of signals acquired in an environment B.

However, in supervised learning, it may be difficult to improve accuracy of recognizing an unknown transmission apparatus with respect to a transmission apparatus with an unknown signal, in other words, with respect to an unknown signal. Specifically, even in an unknown transmission apparatus, improvement of accuracy of recognizing the unknown transmission apparatus can be expected by having learned another transmission apparatus of the same model, but when another transmission apparatus of the same model has not been learned, it is difficult to improve the recognition accuracy.

In this way, it is desired to improve accuracy of recognizing an unknown transmission apparatus, that is, to perform learning in such a way as to improve the accuracy of recognizing the unknown transmission apparatus. Note that, the techniques described in Japanese Unexamined Patent Application Publication No. 2020-173171 and Japanese Unexamined Patent Application Publication No. 2020-173172 are merely techniques for classifying an unknown signal and a known signal, and for example, as can be understood from the fact that signals from a plurality of unknown transmission apparatuses cannot be distinguished and recognized, the techniques are not a technique for recognizing an unknown transmission apparatus, and the recognition accuracy cannot be improved. In addition, the technique described in International Patent Publication No. WO2021/070248 can register a template feature for an unregistered transmission apparatus, but there is room for improvement in point of improving accuracy of a registered template feature, that is, in point of improving recognition accuracy of an unregistered transmission apparatus.

SUMMARY

In view of the above-described problems, an object of the present disclosure is to provide a learning data generation system, a learning system, a method, and a program that are capable of improving recognition accuracy in processing of recognizing an unknown transmission apparatus, based on a signal wirelessly transmitted from the transmission apparatus.

A learning data generation system according to a first aspect of the present disclosure includes: an input unit configured to input, by taking N and n as positive integers, n pieces of first information, which are either n unknown signals being signals wirelessly transmitted from N unknown transmission apparatuses or n unknown radio features being radio features generated from the n unknown signals; an extraction unit configured to input the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extract n sample features corresponding to each of the n pieces of first information; a first clustering unit configured to perform first clustering processing on the n sample features that are results being extracted by the extraction unit; an estimation information acquisition unit configured to input, by taking M and m as positive integers, m pieces of estimation target information to be estimated with respect to the n unknown signals or the n unknown radio features by an estimation apparatus that performs processing different from the first clustering processing, and acquire M pieces of estimation information associated with any one of the n unknown signals or any one of the n unknown radio features; and a generation unit configured to generate, by taking K as a positive integer, a relationship matrix indicating a relationship between a first clustering result indicating a result classified into K groups by the first clustering processing and the M pieces of estimation information.

A learning data generation method according to a second aspect of the present disclosure includes: performing input processing of inputting, by taking N and n as positive integers, n pieces of first information, which are either n unknown signals being signals wirelessly transmitted from N unknown transmission apparatuses or n unknown radio features being radio features generated from the n unknown signals; performing extraction processing of inputting the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extracting n sample features corresponding to each of the n pieces of first information; performing first clustering processing on the n sample features that are results being extracted; performing estimation information acquisition processing of inputting, by taking M and m as positive integers, m pieces of estimation target information to be estimated with respect to the n unknown signals or the n unknown radio features by an estimation apparatus that performs processing different from the first clustering processing, and acquiring M pieces of estimation information associated with any one of then unknown signals or any one of then unknown radio features; and performing generation processing of generating, by taking K as a positive integer, a relationship matrix indicating a relationship between a first clustering result indicating a result classified into K groups by the first clustering processing and the M pieces of estimation information.

A program according to a third aspect of the present disclosure is a program for causing a computer to execute learning data generation processing. The learning data generation processing includes: performing input processing of inputting, by taking N and n as positive integers, n pieces of first information, which are either n unknown signals being signals wirelessly transmitted from N unknown transmission apparatuses or n unknown radio features being radio features generated from the n unknown signals; performing extraction processing of inputting the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extracting n sample features corresponding to each of the n pieces of first information; performing first clustering processing on the n sample features that are results being extracted; performing estimation information acquisition processing of inputting, by taking M and m as positive integers, m pieces of estimation target information to be estimated with respect to the n unknown signals or the n unknown radio features by an estimation apparatus that performs processing different from the first clustering processing, and acquiring M pieces of estimation information associated with any one of the n unknown signals or any one of the n unknown radio features; and performing generation processing of generating, by taking K as a positive integer, a relationship matrix indicating a relationship between a first clustering result indicating a result classified into K groups by the first clustering processing and the M pieces of estimation information.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 8 is a diagram illustrating one example of a relationship matrix being generated by a matrix generation unit and visualized by a visualization unit in FIG. 5;

EXAMPLE EMBODIMENT

Figure 1:
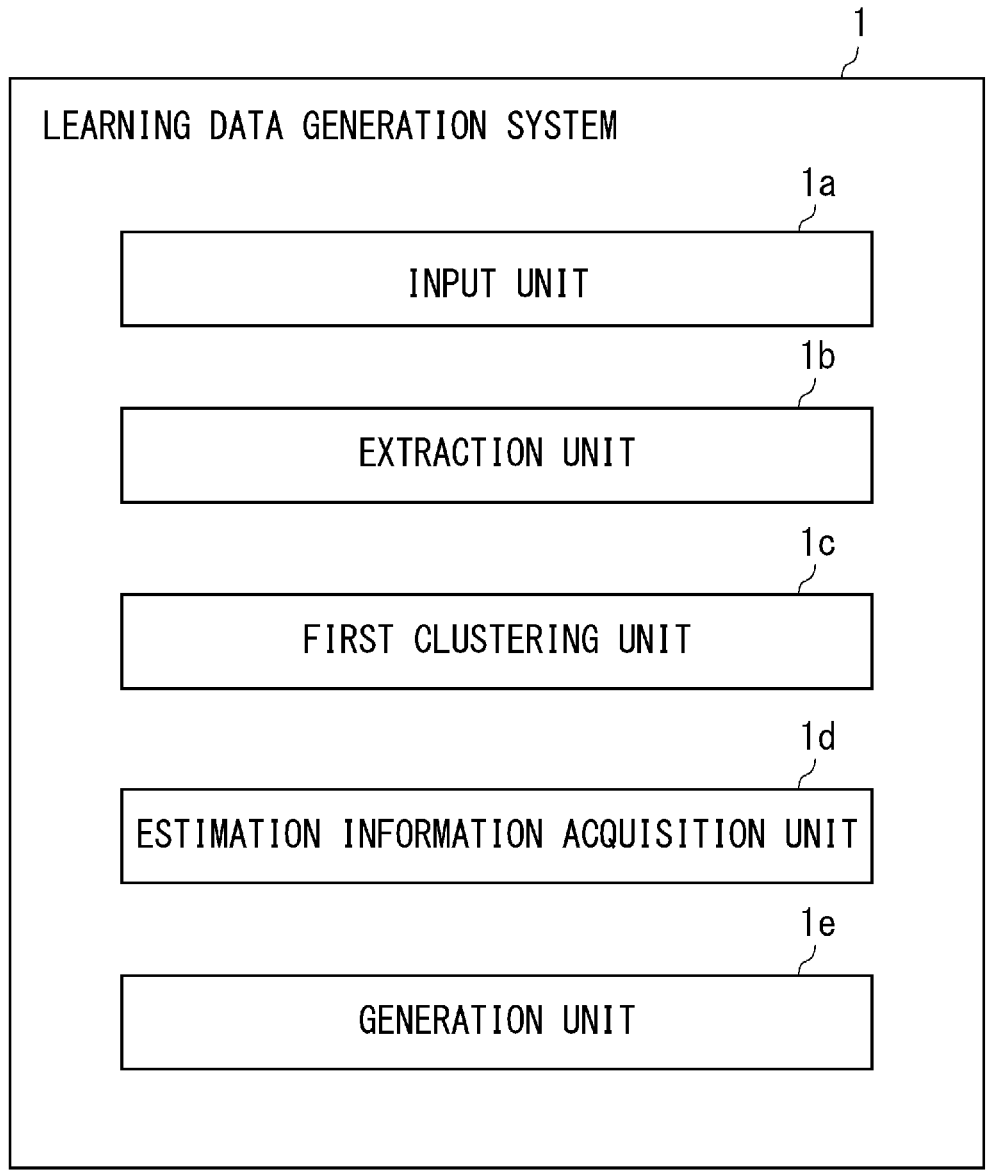
FIG. 1 is a block diagram illustrating one configuration example of a learning data generation system according to a first example embodiment.

Example embodiments will be described below with reference to the drawings. In the present description and the drawings, the same reference signs are given to elements that can be similarly described, therefore a repetitive description may be omitted. In addition, in the drawings to be described below, there is a drawing depicting a unidirectional arrow, but the arrow is intended to simply indicate a direction of a flow of a signal (piece of data), and do not exclude bidirectionality.

First Embodiment

In brief overview, in a first example embodiment and other example embodiments described later, a method of adding a learning data set to learning data by using a label acquired by estimating an unknown transmission apparatus by another means can be adopted. However, when the method is adopted as it is, it cannot be used when accuracy (reliability) of the label acquired by the above estimation is low, and conversely, performance may be deteriorated, and therefore, each example embodiment will be described together with a method of solving such a problem.

The first example embodiment will be described with reference to FIGS. 1 to 3. FIG. 1 is a block diagram illustrating one configuration example of a learning data generation system according to the first example embodiment.

As illustrated in FIG. 1, a learning data generation system (hereinafter, a present system) 1 according to the present example embodiment includes an input unit 1a, an extraction unit 1b, a first clustering unit 1c, an estimation information acquisition unit 1d, and a generation unit 1e. The present system 1 can be configured by a single apparatus, but can also be configured as a distributed system in which a function is distributed to a plurality of apparatuses.

The input unit 1a inputs n pieces of first information, which is either n unknown signals (unregistered signals or unlearned signals) that are signals wirelessly transmitted from N unknown transmission apparatuses (unregistered or unlearned transmission devises) or n unknown radio features. The unknown radio feature refers to an unregistered radio feature or an unlearned radio feature. Herein, N and n are positive integers, and the n unknown radio features are radio features generated from each of the n unknown signals, and the number of dimensions (the number of types of information) of each unknown radio feature is not considered. Note that, the unregistered transmission apparatus refers to a transmission apparatus in which a template feature for recognizing the transmission apparatus by recognizing a sample feature extracted by the extraction unit 1b, which will be described later, is not registered. In addition, the unregistered signal refers to a signal transmitted from such an unregistered transmission apparatus. In addition, the unlearned signal and the unlearned transmission apparatus refer to, regardless of whether to be registered or unregistered, a signal and a transmission apparatus each which are not to be learned in a supervised learning model, which will be described later.

When n unknown signals are input, the unknown signals can also be separated in advance according to a radio feature such as signal strength or a radio frequency band, or the like. However, it is also possible to define as n unknown signals by making n unknown at an input time and classifying into n as an extraction result in the extraction unit 1b described later. As described above, n and N may be unknown at a time of input by the input unit 1a, and the number of pieces of original first information in which n sample features are extracted by the extraction unit 1b described later is described with expression as n. In addition, basically, data of a plurality of reception signals or radio features are acquired from one transmission apparatus, and the total number n of pieces of the first information is a sum acquired by adding the number of pieces of data of each transmission apparatus, for N transmission apparatuses.

As can be understood from these expression examples, the following description will be made on an assumption that one sample feature is extracted for one piece of first information for the sake of simplification of description, but the number of dimensions (the number of types of features) of the sample feature extracted from one piece of first information is not considered.

Note that, the input unit 1a can input n pieces of first information at a time, but can also input some or all pieces of first information individually. For example, when the first information is an unknown signal, the input unit 1a may be a wireless receiving unit that receives an unknown signal, and can simultaneously receive a plurality of unknown signals. In addition, when the first information is an unknown radio feature, the input unit 1a can individually input an unknown radio feature every time when the unknown radio feature is generated from each unknown signal.

The extraction unit 1b inputs n pieces of first information to a supervised learning model generated from learning data to be described below, and extracts n sample features corresponding to each of the n pieces of first information. The extraction unit 1b can include such a learning model, or can be configured to be accessible to such a learning model. The number of dimensions of each sample feature is also not considered, but can be lower than the number of dimensions of the unknown radio feature in a case where the first information is the unknown radio feature.

The learning data described above are data including second information which is either a known signal or a known radio feature being a radio feature generated from the known signal, and a correct answer label thereof. Herein, the known signal included in the learning data is a signal for which it is determined from which transmission apparatus the signal is wirelessly transmitted, that is, a signal for which a transmission apparatus as a transmission source is known, and whether to be registered is not considered. The correct answer label at a learning time is a label associated with a known signal, or a label associated with a radio feature of the known signal. In this way, the correct answer label can be a label associated with the second information. Note that, the correct answer label may be a label associated with a sample feature of the known signal at a time of registration. As described above, the known signal and the known radio feature each refer to a signal and a radio feature of which the transmission apparatus as the transmission source is known.

As described above, the learning model described above is a model in which machine learning is performed in such a way as to acquire a sample feature which becomes a correct answer with respect to the second information being a known signal or a known radio feature, and output a correct answer label indicating the sample feature. Alternatively, a model in which a part of the model is cut out as a sample feature extractor, and machine learning is performed in such a way that the sample features having the same correct answer label have a high degree of similarity and high correlation, and the sample features having different correct answer labels have a low degree of similarity and low correlation can also be adopted. Regardless of an algorithm of the machine learning, for example, a convolutional neural network (CNN) in which a waveform of a reception signal or a radio feature thereof is input and a correct answer label indicating the correct answer feature is output can be adopted. However, the algorithm of the machine learning is not limited thereto, and various algorithms such as, for example, an algorithm of another deep learning in which a value of a reception signal or a value of a radio feature is input and a correct answer label indicating a correct answer feature is output can be applied.

In addition, both of an unknown transmission apparatus and a known transmission apparatus can be wireless terminal apparatuses (wireless terminals) capable of wireless communication, but an apparatus for unintentionally transmitting a radio wave (a light emitting diode (LED) device for emitting noise, a wireless apparatus in which an amplifier has failed, or the like) may also be included. Hereinafter, regardless of whether to be known or unknown, the transmission apparatus may be referred to as a "transmission terminal" or simply as a "terminal".

The first clustering unit 1c performs first clustering processing on n sample features being a result of extraction by the extraction unit 1b. Note that, expression "first" herein is merely expression for distinguishing from another clustering unit (second clustering unit), another clustering processing (second clustering processing), and the like, which will be described later in a third example embodiment. Note that, the clustering unit can also be referred to as a cluster analyzing unit.

The first clustering unit 1c outputs a result classified into K groups as a result of the first clustering processing (hereinafter, a first clustering result). Herein, K is a positive integer, and can also be a predetermined number of clusters, but there is also a scene where there is a cluster that one sample feature does not fall even in clustering in which the number of clusters is predetermined. Therefore, K is merely the number of groups classified as the first clustering result. The first clustering result can include, for example, an identification number or an identifier, such as a cluster number assigned to each sample feature.

Regardless of an algorithm of the first clustering processing, for example, clustering by a degree of similarity comparison can be adopted, or a machine learning method such as a k-means method, a x-means method, or a vbgmm can also be adopted. In addition, as an algorithm of the first clustering processing, a hierarchical clustering method using a group average method, a Ward's method, a minimum distance method, a maximum distance method, or the like can also be adopted.

The estimation information acquisition unit 1d inputs m pieces of estimation target information to be estimated by an estimation apparatus that performs processing different from the first clustering processing, with respect to n unknown signals or n unknown radio features. Herein, m is a positive integer. In addition, the estimation target information input by the estimation information acquisition unit 1d is an unknown signal transmitted from the same transmission terminal as the first information input by the input unit 1a or an unknown radio feature generated from the unknown signal, and these pieces of information are a target to be estimated in the estimation apparatus. However, the unknown signal or the unknown radio feature serving as the estimation source (target to be estimated) is not necessarily input as data in the same format as the first information input by the input unit 1a, in the estimation apparatus. As a simple example, for example, an unknown radio feature can be input to the estimation apparatus when the first information is an unknown signal, and an unknown signal can be input to the estimation apparatus when the first information is an unknown radio feature. In addition, when both the first information and the second information are input with unknown radio features, since there is a possibility that each of pieces of information is generated by any methods, the data formats can be different from each other. In addition, since the number of unknown signals or the number of unknown radio features of the estimation source may be different from the number n of pieces of the first information, the number of pieces of estimation target information input by the estimation information acquisition unit 1d is described as m pieces.

Then, the estimation information acquisition unit 1d acquires M pieces of estimation information associated with any one of n unknown signals or any one of n unknown radio features. Herein, M is a positive integer. Note that, processing of the estimation information acquisition unit $1d$ and the first clustering processing of the first clustering unit $1c$ can also be performed in parallel regardless of an order.

Needless to say, estimation processing including the clustering processing can be applied to the estimation apparatus described above, but the clustering processing differs from the first clustering processing in at least one of an algorithm, a format of input data, and a clustering threshold value. Herein, in the above estimation apparatus, since N pieces of estimation information are not necessarily output on an assumption that there are the same number of estimation apparatuses as the number N of actual transmission apparatuses, the number of estimation information is described as M pieces instead of N pieces. Further, in the estimation apparatus described above, since processing different from the first clustering processing is performed, and the same number of pieces of estimation information as K pieces being a clustering result in the first clustering unit $1d$ is not necessarily output, the number of pieces of estimation information is described as M pieces instead of K pieces. Note that, for convenience, the estimation apparatus is described as not being included in the present system, but the estimation apparatus can also be included to configure the present system.

The estimation information acquisition unit $1d$ acquires M pieces of estimation information from m pieces of input estimation target information, but the method is not considered. For example, as described in a second example embodiment, m pieces of input estimation target information may be as m radio features or m signals, and M pieces of estimation information associated with m radio features or m signals can also be input. Even in this case, in the estimation information acquisition unit $1d$, m pieces of estimation target information may be associated with any one of the n unknown signals or any one of the n unknown radio features already at an input time point of the m pieces of estimation target information. Alternatively, the estimation information acquisition unit $1d$ may perform such association when m pieces of estimation target information are input. In the latter case, for example, the estimation information acquisition unit $1d$ can perform association with n unknown signals or n unknown radio features with respect to each of m pieces of finally acquired estimation target information by calculating a degree of similarity with n unknown signals or n unknown radio features, and the like.

The generation unit $1e$ generates a relationship matrix indicating a relationship between the first clustering result classified into K groups by the first clustering processing and M pieces of estimation information acquired by the estimation information acquisition unit $1d$. When the relationship matrix is generated, the first clustering result and the estimation result (estimation information) can be acquired an association with each other, based on each of an unknown signal or an unknown radio feature, that is, with the unknown signal or the unknown radio feature as a common term. The generation unit $1e$ can generate a relationship matrix by arranging a statistical value such as a frequency of an unknown signal or a frequency of an unknown radio feature in a matrix of K×M, for example.

In the present system, it is possible to generate such a relationship matrix, and the generated relationship matrix can be used to generate the following learning data. In other words, in the present system, it is possible to generate learning data capable of improving extraction accuracy for extracting a sample feature from a signal wirelessly transmitted from an unknown transmission terminal or a radio feature of the signal. In this way, in the present system, it is possible to generate learning data capable of improving recognition accuracy in processing of recognizing an unknown transmission terminal, based on a signal wirelessly transmitted from the transmission terminal (including a case based on a radio feature of the signal).

Next, a learning system including the learning data generation system 1 will be described with reference to FIG. 2. FIG. 2 is a block diagram illustrating one configuration example of a learning system including the learning data generation system 1 in FIG. 1.

Figure 2:
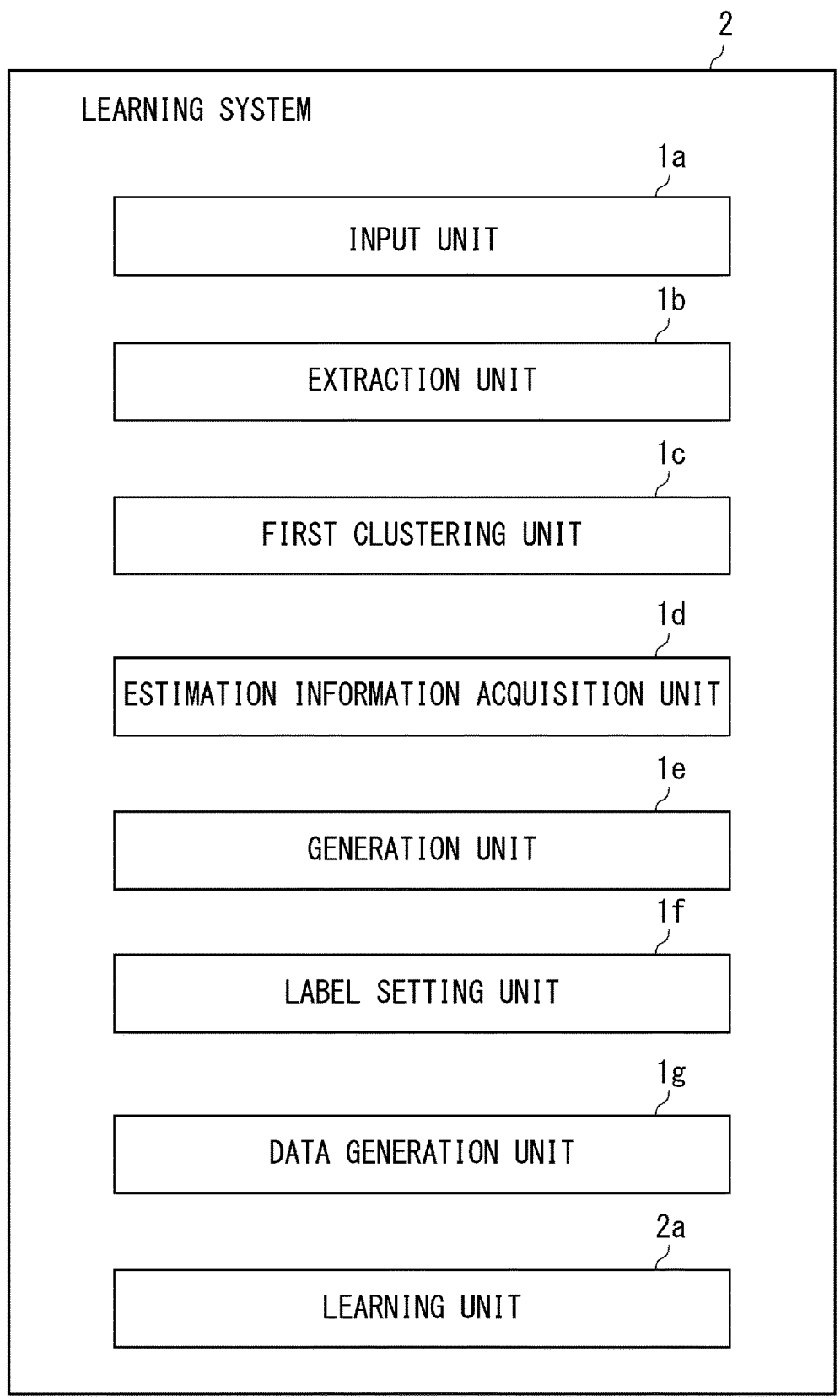
FIG. 2 is a block diagram illustrating one configuration example of a learning system including the learning data generation system in FIG. 1.

A learning system 2 illustrated in FIG. 2 includes the present system 1 illustrated in FIG. 1 and a learning unit $2a$, and further includes a label setting unit $1f$ and a data generation unit $1g$ in the present system 1. The learning system 2 can be configured by a single apparatus, but can also be configured as a distributed system in which a function is distributed to a plurality of apparatuses.

The label setting unit $1f$ sets a correct answer label for at least some of intersection points among the intersection points (K×M intersection points) of a generated relationship matrix. Note that, the intersection point can also be referred to as a cell. The label setting unit $1f$ can include an operation unit that accepts an input or a selection input for specifying a correct answer label from an operator who generates learning data.

In addition, although not illustrated, the learning system 2 preferably includes a display unit (display apparatus) for displaying the generated relationship matrix. This allows an operator to set the correct answer label while viewing a visualized relationship matrix. In addition, a first clustering result can also be displayed on the display unit. Note that, the display unit can also be included in the learning data generation system 1 illustrated in FIG. 1.

However, the label setting unit $1f$ can also be configured to automatically set the correct answer label without input from an operator. In this case, a learning model for such a setting can be used. For example, it is possible to perform setting based on an input of an operator at an initial stage of operation, acquire recognition accuracy based on a content of the setting and the setting, and generate the learning model using the setting content with improved recognition accuracy as training data. An algorithm for the learning model is also not considered. Alternatively, the correct answer label can also be automatically set by threshold value determination or the like, based on information related to among K clusters being performed clustering or information such as reliability of M pieces of estimation information. In the description of the present example embodiment and the description of the second and the subsequent example embodiments, it is assumed that the correct answer label is set by an operator. However, it is also possible to automatically set the correct answer label as described above, in which case the automatic setting can be explained by replacing the explanation of the determination by the operator with the automatic setting by the determination of the learning model (result output) or threshold value determination, etc.

The data generation unit $1g$ generates learning data for updating a learning model used in the extraction unit $1b$, based on an unknown signal or an unknown radio feature associated with each of the at least some intersection points and a correct answer label set for each of the at least some intersection points. The K×M intersection points included in the relationship matrix include an intersection point associated with at least one of n unknown signals and n unknown radio features, and an intersection point not associated with the n unknown signals or unknown radio features. Note that, although description has been made on an assumption that n≤m, when n>m, it can be said that the K×M intersection points include an intersection point associated with at least one of m pieces of estimation target information and an intersection point not associated with m pieces of estimation target information. When n=m, all n unknown signals or unknown radio features are associated with any one of m pieces of estimation target information (radio feature or signal), and are also associated with any of intersection points. On the other hand, when there is an unknown signal or an unknown radio feature that cannot be associated with any of m pieces of estimation target information among the n unknown signals or unknown radio features, such an unknown signal or unknown radio feature can be excluded from the relationship matrix. Similarly, when there is information that cannot be associated with any of the n unknown signals and unknown radio features among the m pieces of estimation target information, such information can be excluded from the relationship matrix.

The data generation unit $1g$ can generate one set of pieces of learning data for each correct answer label. Then, the one set can include data (such as a raw data set, or data of a statistical value such as an average value or a median value) acquired from one or a plurality of unknown signals or unknown radio features associated to one or a plurality of intersection points at which a correct answer label is set, and the correct answer label thereof.

The learning unit $2a$ performs machine learning, based on additional learning data being learning data generated by the system 1, and original learning data being learning data including the second information, which was learning target data in the original learning model, and a correct answer label associated with a sample feature of a known signal. The learning unit $2a$ updates the learning model by the machine learning. In addition, although depending on an algorithm of the learning model, the update can also be performed only with the additional learning data.

In the learning system 2, by updating the learning model in this manner, it is possible to improve extraction accuracy of extracting a sample feature from a signal wirelessly transmitted from an unknown transmission terminal or a radio feature of the signal. As a result, it is possible to improve recognition accuracy in processing of recognizing an unknown transmission terminal, based on a signal wirelessly transmitted from the transmission terminal (including a case based on a radio feature of the signal).

Next, a transmission apparatus recognition system including the learning data generation system 1 will be described with reference to FIG. 3. FIG. 3 is a block diagram illustrating one configuration example of a transmission apparatus recognition system including the learning data generation system 1 in FIG. 1.

Figure 3:
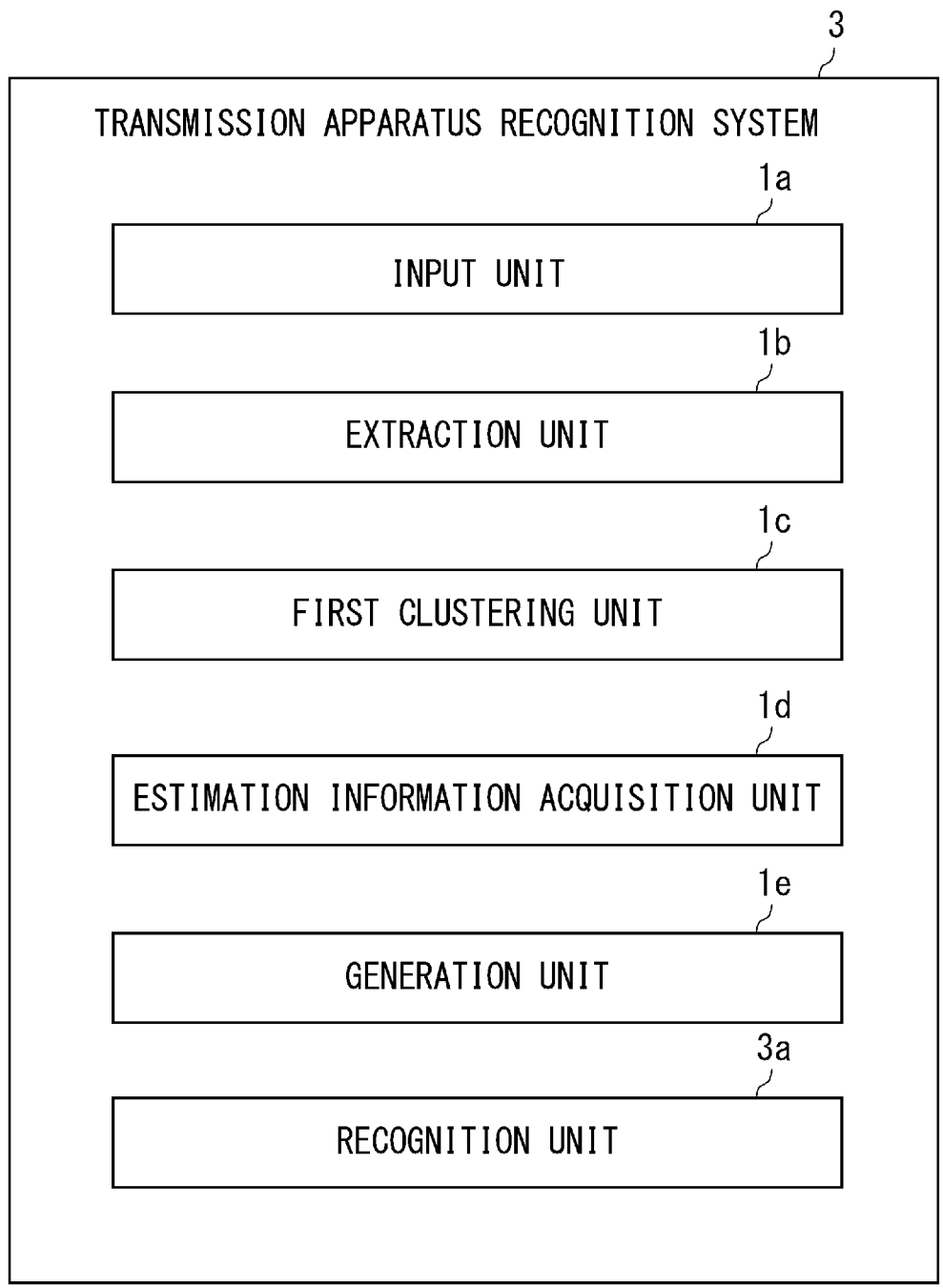
FIG. 3 is a block diagram illustrating one configuration example of a transmission apparatus recognition system including the learning data generation system in FIG. 1.

A transmission apparatus recognition system 3 illustrated in FIG. 3 is a system including the present system 1 illustrated in FIG. 1 and a recognition unit $3a$, in other words, a system including a recognizing function in the learning data generation system. In this manner, since the transmission apparatus recognition system 3 also generates learning data, it can also be referred to as a learning data generation system.

In the example described in FIGS. 1 and 2, the description has been made on an assumption that a known signal (i.e., a signal for which a transmission apparatus as a transmission source is known or registered) is basically not received, or that a radio feature associated to the known signal is not input or is ignored even when the signal is input. On the other hand, in the transmission apparatus recognition system 3, the input unit $1a$ is configured in such a way as to input these. Especially, when information input by the input unit $1a$ is a signal, a known signal may be mixed, and a known signal and an unknown signal may inevitably be received, therefore it is useful to configure to cope with such a case.

The input unit $1a$ in the transmission apparatus recognition system 3 inputs third information, which is either a signal wirelessly transmitted from a plurality of any transmission terminals or a radio feature generated from the signal, as information including the first information. The extraction unit $1b$ in the transmission apparatus recognition system 3 inputs the third information into a learning model, and extracts a sample feature for the third information.

Then, the recognition unit $3a$ recognizes the sample feature of the extracted third information with a template feature registered in advance. The template feature may be stored in advance in a storage apparatus. It is desirable that the template feature of a certain transmission terminal is representative of a large number of sample features. Successful recognizing of the sample features means successful recognizing of the transmission terminal. Regardless of a method of recognizing in the recognition unit $3a$, for example, various methods such as a method of performing a degree of similarity comparison can be applied. A detailed description of an example of recognizing by calculating a degree of similarity is omitted, but a technique described in, for example, International Patent Publication No. WO2021/070248 or the like can be applied. Note that, "recognize" can also be reworded to "identify", "specify", "decide", "determine", or the like.

On the other hand, the sample feature determined to be unknown or unregistered by recognition is a sample feature extracted with respect to an unknown signal wirelessly transmitted from an unregistered transmission terminal or an unknown radio feature generated from the unknown signal. The unknown signal or the unknown radio feature can be a generation target of learning data in the present system 1. Note that, the sample feature determined to be unknown or unregistered in recognition can refer to a sample feature whose degree of similarity is lower than a recognition threshold value when the recognition is performed by calculating the degree of similarity.

Therefore, the first clustering unit $1c$ in the transmission apparatus recognition system 3 performs the first clustering processing on the sample feature determined to be unknown or unregistered in the recognition in the recognition unit $3a$ among the n sample features. The processing in the estimation information acquisition unit $1d$ and the generation unit $1e$ is similar that described as the present system 1, and estimation information is acquired and a relationship matrix is generated. However, the first clustering unit $1c$ can also have, as a target of the first clustering processing, not only from the sample feature determined to be unknown or unregistered by the recognition unit $3a$ but also including another sample feature used for recognition by the recognition unit $3a$.

In addition, the transmission apparatus recognition system 3 can further include a template feature registration unit (not illustrated) for generating and registering a template feature from a sample feature determined to be unknown or unregistered in the recognition in the recognition unit $3a$. As a method of generating the template feature from the sample feature determined to be unknown or unregistered by the recognition, for example, the method described in International Patent Publication No. WO2021/070248 can be applied, but the method is not limited thereto. However, the template feature registration unit can also generate the template feature not only from the sample feature determined to be unknown or unregistered by the recognition unit 3a but also from another sample feature used for recognition by the recognition unit 3a.

In addition, although illustration and description are omitted, the transmission apparatus recognition system 3 can also be configured in such a way as to include the label setting unit 1f, the data generation unit 1g, and the learning unit 2a. In addition, the transmission apparatus recognition system 3 can also be configured by a single apparatus, but can also be configured as a distributed system in which a function is distributed to a plurality of apparatuses.

For example, it is also possible to arrange the recognition unit 3a in an edge apparatus as a transmission apparatus recognition apparatus and arrange other parts in a high-performance apparatus, or arrange the learning unit 2a in a high-performance apparatus and arrange other parts in an edge device. In general, when learning machine is learning, required computing performance is often sufficiently large as compared with that at a time of operation (inference). In particular, when deep learning is used for model generation (generation of a learning parameter), it is conceivable to use a high-performance graphics processing unit (GPU) at a time of learning. A GPU has high performance, but is expensive and consumes high power, therefore, there is a problem that the GPU is not suitable for an application in which a large number of transmission apparatus recognition apparatuses are arranged in a wide range as edge devices.

However, such a problem can be solved by generating a learning model by performing learning with an external high-performance apparatus, and performing sample feature extraction by utilizing a hardware accelerator dedicated to inference, which is inexpensive and low power consumption, in an edge device. In other words, by adopting such a configuration, it is possible to recognize a terminal and generate additional learning data inexpensively and with low power consumption in an application in which a large number of transmission apparatus recognition apparatuses are arranged in a wide range as edge devices.

Second Embodiment

While a second example embodiment will be described focusing on difference from the first example embodiment with reference to FIGS. 4 to 12, various examples described in the first example embodiment can also be applied to the second example embodiment. Needless to say, the various examples described in the present example embodiment can be applied to the first example embodiment as well.

Figure 4:
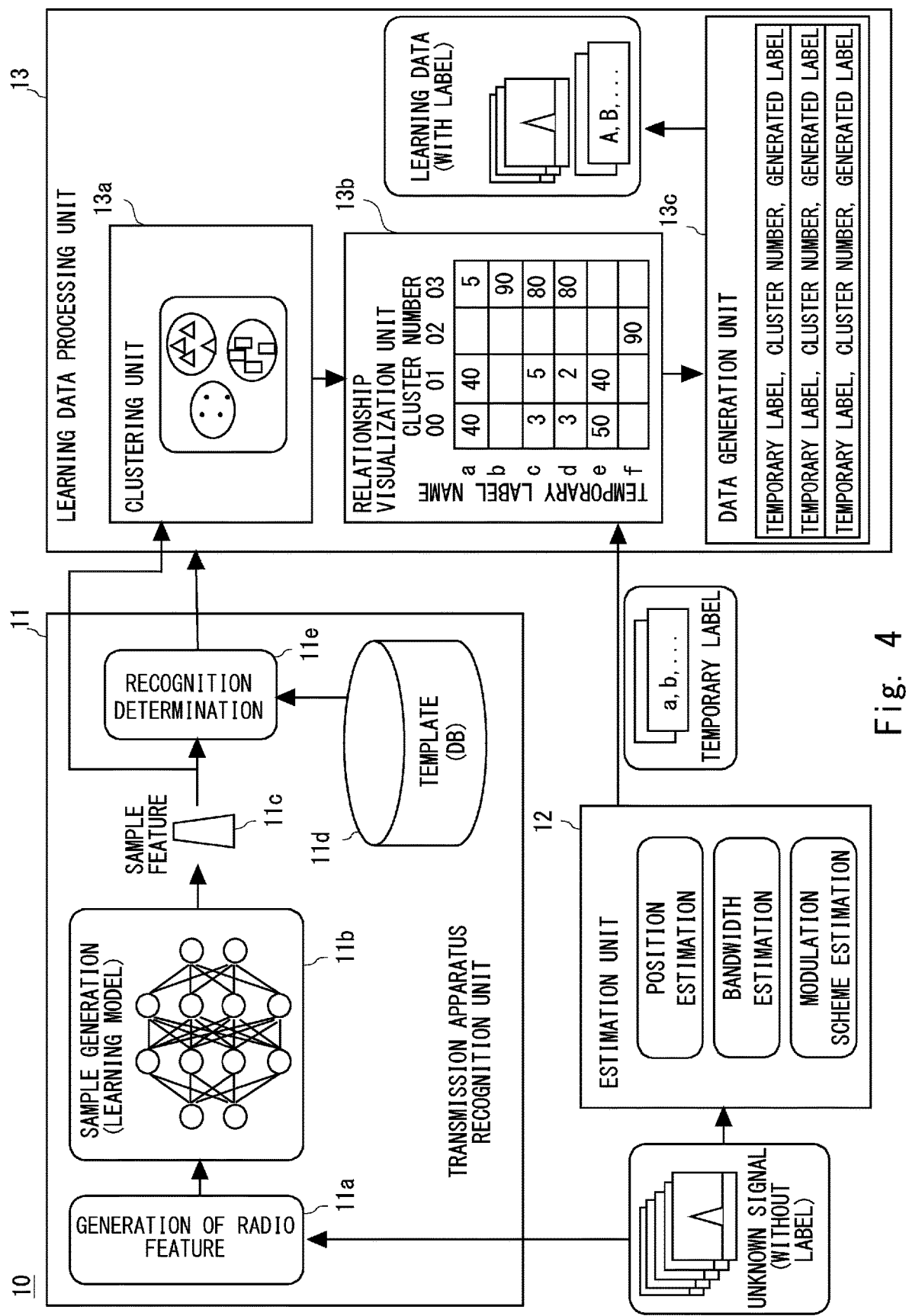
FIG. 4 is a diagram for describing an outline of a transmission apparatus recognition system according to a second example embodiment.

First, referring to FIG. 4, an outline of a transmission apparatus recognition system functioning as a learning data generation system according to the second example embodiment will be described. FIG. 4 is a diagram for describing an outline of the transmission apparatus recognition system according to the second example embodiment. Note that, the description of the outline is not intended to be limiting in any way.

As illustrated in FIG. 4, a transmission apparatus recognition system 10 (hereinafter, a present system 10) according to the present example embodiment can include a transmission apparatus recognition unit 11, an estimation unit 12, and a learning data processing unit 13.

The transmission apparatus recognition unit 11 is one example of an input unit 1a, an extraction unit 1b, and a recognition unit 3a in FIG. 3. The input unit 1a in this example receives an unknown signal, and performs generation 11a of a radio feature from the received unknown signal. The extraction unit 1b in this example generates a sample feature 11c by inputting each generated radio feature to a learning model 11b learned by a known signal. Then, the recognition unit 3a in this example recognizes each generated sample feature 11c with a template (template feature) 11d registered in advance in a database (DB), and performs recognition determination 11e.

The recognition determination 11e outputs a recognition result such as a transmission terminal of the associated template in a case where the recognition succeeds. In a case where all of the input unknown signals are signals transmitted by an unregistered (unknown) transmission terminal, when recognition accuracy is high, there is basically no sample feature that succeeds in recognition, and it is determined that all of the sample features to be recognized are unregistered (unknown). On the other hand, in the recognition determination 11e, when it is determined that a sample feature is unknown or unregistered in recognition, the sample feature for which such determination is made is output to the learning data processing unit 13.

Note that, a reception signal being input to the transmission apparatus recognition unit 11 and received by wireless transmission is referred to as an unknown signal because it is before the recognition and unknown for the transmission apparatus recognition unit 11. However, a reception signal being input to the transmission apparatus recognition unit 11 includes not only an unknown signal wirelessly transmitted from an unregistered transmission terminal but also a known signal wirelessly transmitted from a registered transmission terminal in a scene where there is a sample feature that succeeds in recognition.

The learning data processing unit 13 inputs the sample feature output from the transmission apparatus recognition unit 11, and performs processing of generating learning data for the input sample feature. The learning data processing unit 13 includes a clustering unit 13a, a relationship visualization unit 13b, and a data generation unit 13c. The clustering unit 13a is equivalent to a first clustering unit 1c in FIG. 2, the relationship visualization unit 13b is equivalent to a generation unit 1e in FIG. 2, and the data generation unit 13c is equivalent to a label setting unit 1f and a data generation unit 1g in FIG. 2. In the clustering unit 13a, first clustering processing is performed on an input sample feature, and as a result, a cluster number can be assigned to each sample feature.

Prior to the description of the relationship visualization unit 13b and the data generation unit 13c, the estimation unit 12 will be described. The estimation unit 12 includes an estimation apparatus for estimating a transmission terminal, described in the first example embodiment. The estimation apparatus includes an estimation information acquisition unit 1d, performs processing different from the first clustering processing on n unknown signals or n unknown radio features, and outputs M pieces of estimation information as information indicating M transmission terminals. The M pieces of estimation information to be output are information associated with any one of the n unknown signals or any one of the n unknown radio features.

However, in the present example embodiment, m radio features are input as m pieces of estimation target information, and M pieces of estimation information including M temporary labels associated with any one or plurality of the m radio features are also input. In other words, the M pieces of estimation information are included in information input from the estimation apparatus. Note that, instead of the m radio features, m signals can also be adopted. The M temporary labels are labels indicating each of M transmission apparatuses. In other words, in the present example embodiment, M pieces of estimation information including M temporary labels indicating each of M transmission apparatuses, and m radio features (or signals) associated with any of the M temporary labels are input from the estimation apparatus. The estimation unit 12 may generate M temporary labels, by estimation, from the same unknown signal as the unknown signal (or an unknown radio feature generated from the unknown signal by any method) input to the transmission apparatus recognition unit 11, that is, from m signals or radio features, and the estimation method is not considered.

Herein, the temporary label represents information related to a transmission terminal, and can be, for example, a model name, an individual ID, or the like, but it is not a reliable label such as a known signal, that is, a correct answer label, but a label inferred by the estimation apparatus, based on some pieces of other information. As will be described later, each piece of estimation information can include a temporary label and together reliability information indicating reliability thereof in association with each other.

In this example, the estimation unit 12 includes a position estimation function of estimating a position of the transmission terminal, a bandwidth estimation function of estimating a bandwidth of a signal (hereinafter, wireless transmission signal) to be wirelessly transmitted by the transmission terminal, and a modulation scheme estimation function of estimating a modulation scheme to be used when generating the wireless transmission signal.

In addition, the estimation unit 12 can also include a radio frequency estimation function of estimating a radio frequency or a radio frequency band of a radio transmission signal, a transmission power estimation function of estimating a power value of a radio transmission signal, and a transmission frequency estimation function of estimating a frequency at which a radio transmission signal is transmitted (a frequency at which a transmission terminal transmits a signal). In addition, the estimation unit 12 can also include a transmission time occupancy rate estimation function of estimating an occupancy rate of a time in which a radio transmission signal is transmitted, a packet length estimation function of estimating a transmission packet length of a radio transmission signal, and a transmission data amount estimation function of estimating an amount of data transmitted as a radio transmission signal. In addition, the estimation unit 12 can also include a radio frequency hopping estimation function of estimating a radio frequency switching pattern in a case where a radio transmission signal is transmitted by a radio frequency hopping method. In addition, the estimation unit 12 can also include a spectrogram estimation function of estimating a spectrogram of a radio transmission signal, and a spectrum estimation function of estimating a spectrum of a radio transmission signal.

However, the estimation unit 12 can include at least one of the functions listed herein, for example. In other words, estimation information can be information acquired by estimating, by the estimation apparatus, at least one of, for example, a position of each of M transmission terminals, a band and a radio frequency of a signal wirelessly transmitted by each of M transmission terminals, a modulation scheme used by each of M transmission terminals, and the like.

The relationship visualization unit 13b inputs a temporary label estimated by the estimation apparatus and a first clustering result being a processing result of the clustering unit 13a, and generates a relationship matrix indicating a relationship between the temporary label and the first clustering result. The relationship matrix is generated to be referred to when setting a correct answer label by using the estimation information estimated by the estimation apparatus. The temporary label and the first clustering result can be associated with each other by an original unknown signal or an original unknown radio feature as a key (common term).

The relationship visualization unit 13b visualizes the generated relationship matrix by displaying on a display unit. As described in the label setting unit 1f, the data generation unit 13c sets a correct answer label for some of intersection points among the K×M intersection points of the relationship matrix. In FIG. 4, at each intersection point, a frequency of appearance among n original sample features, in other words, a frequency of appearance among n unknown signals or n unknown radio features is illustrated. However, not limited to this example, instead of a frequency of appearance, a form of an appearance rate to a whole may be displayed. In addition, instead of a frequency of appearance and an appearance rate, various first clustering results such as sum of distances from the center of gravity of each cluster or the distances from the center point of a cluster area can be displayed at the intersection point. In addition, two or more kinds of values may be displayed at each intersection point. Needless to say, a display format of the relationship matrix is not limited to the example. Note that, in the present example embodiment, similarly to the first example embodiment, description is made on an assumption that n≤m, and description of a case where n>m is omitted.

The setting of the correct answer label can be performed by an operation by an operator, and for an intersection point with high reliability indicated in the relationship matrix, the correct answer label is set in a piece of data associated with the intersection point. Needless to say, the setting of the correct answer label may not be performed at all when there is no intersection point with high reliability. Although the reliability will be described later, for example, an operator can recognize that the higher the value at an intersection point (for example, a frequency value such as the number of pieces of data associated to the intersection point or another statistical value) is, the higher the reliability of the intersection point is.

In addition, the data generation unit 13c generates additional learning data in which a correct answer label is added only to a piece of data having high reliability. Specifically, the data generation unit 13c generates learning data, based on the correct answer label being determined by an operator to have high reliability and set for each of some intersection points, and an unknown signal or an unknown radio feature associated with each of the intersection points. The learning data is learning data for additional learning for updating the learning model 11b, and can be referred to as additional learning data. Herein, one correct answer label can also be set for a plurality of intersection points.

For example, the additional learning data can include data such as an unknown signal associated with a temporary label or a cluster number associated to one or a plurality of intersection points determined to be highly reliable, and a set correct answer label (generated label). The generation of the additional learning data can be automatically performed with reference to text information by associating data such as an unknown signal with the temporary label and the cluster number, for example, as described above. The text information described above is information that lists a combination of a temporary label, a cluster number, and a correct answer label for each of the set correct answer labels, and can be stored in a table format or the like, for example.

In addition, as understood from the description, the temporary label can be information of a candidate used as a correct answer label of the learning model. However, the candidate of the correct answer label is not limited thereto. For example, it is also possible that a label named in such a way as to include a cluster number is set as a correct answer label, or a correct answer label is set by using a serial number or the like in such a way as not to be overlapped with any other label.

In this manner, the data generation unit 13c can generate one set of learning data for each set correct answer label. The one set can include data (such as a raw data set, or data of a statistical value such as an average value or a median value) acquired from one or a plurality of unknown signals or unknown radio features associated to one or a plurality of intersection points at which a correct answer label is set, and the correct answer label thereof.

The learning model 11b is updated by performing machine learning, based on the additional learning data and original learning data being learning data including second information, which was the learning target data in an original learning model, and a correct answer label associated with the second information.

Note that, setting of a correct answer label is basically performed by an operator in order to improve accuracy, and generation of additional learning data thereafter can be performed automatically. However, since a degree of reliability and the like can also be automatically determined, the setting of the correct answer label and the generation of additional learning data can also be performed without intervention of an operator by installing a function of accurately performing the determination of the degree of reliability.

In this manner, in the present system 10, a relationship matrix indicating a relationship between a result estimated by another estimation apparatus and a first clustering result can be generated, the generated relationship matrix is visualized, and thereby a highly reliable intersection point can be indicated. Therefore, in the present system 10, an operator can set a correct answer label for an unknown signal, based on reliability, that is, can perform the correct answer labeling with high reliability, and as a result, it is possible to generate additional learning data for the unknown signal with high reliability.

Then, since the present system 10 can re-learn the learning model 11b by using the additional learning data, an appropriate sample feature can be extracted. As a result, in the present system 10, it is possible to improve recognition accuracy of an unknown transmission terminal and improve recognition accuracy of a known transmission terminal.

Figure 5:
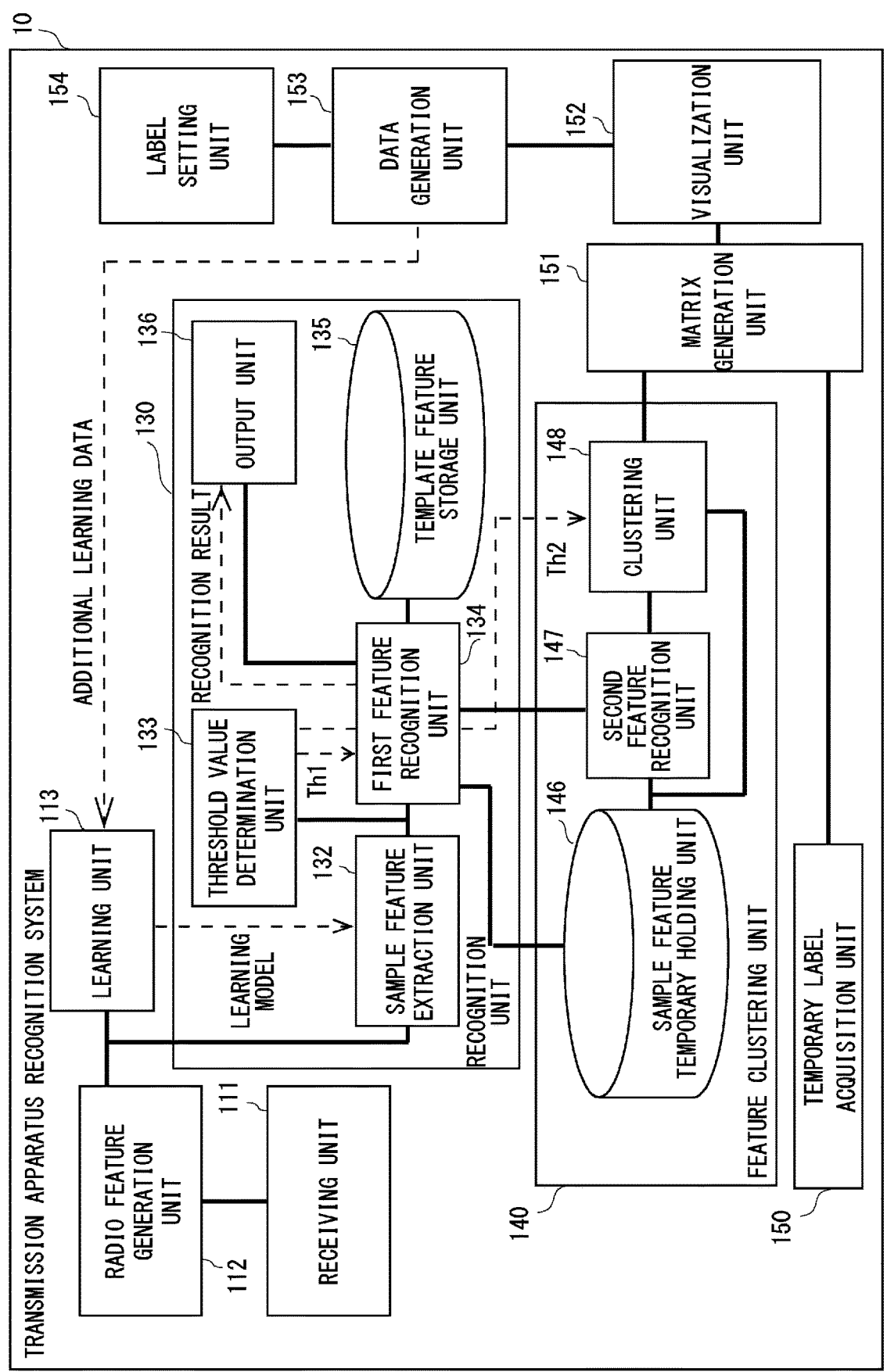
FIG. 5 is a block diagram illustrating an example of a functional configuration of the transmission apparatus recognition system according to the second example embodiment.
Figure 6:
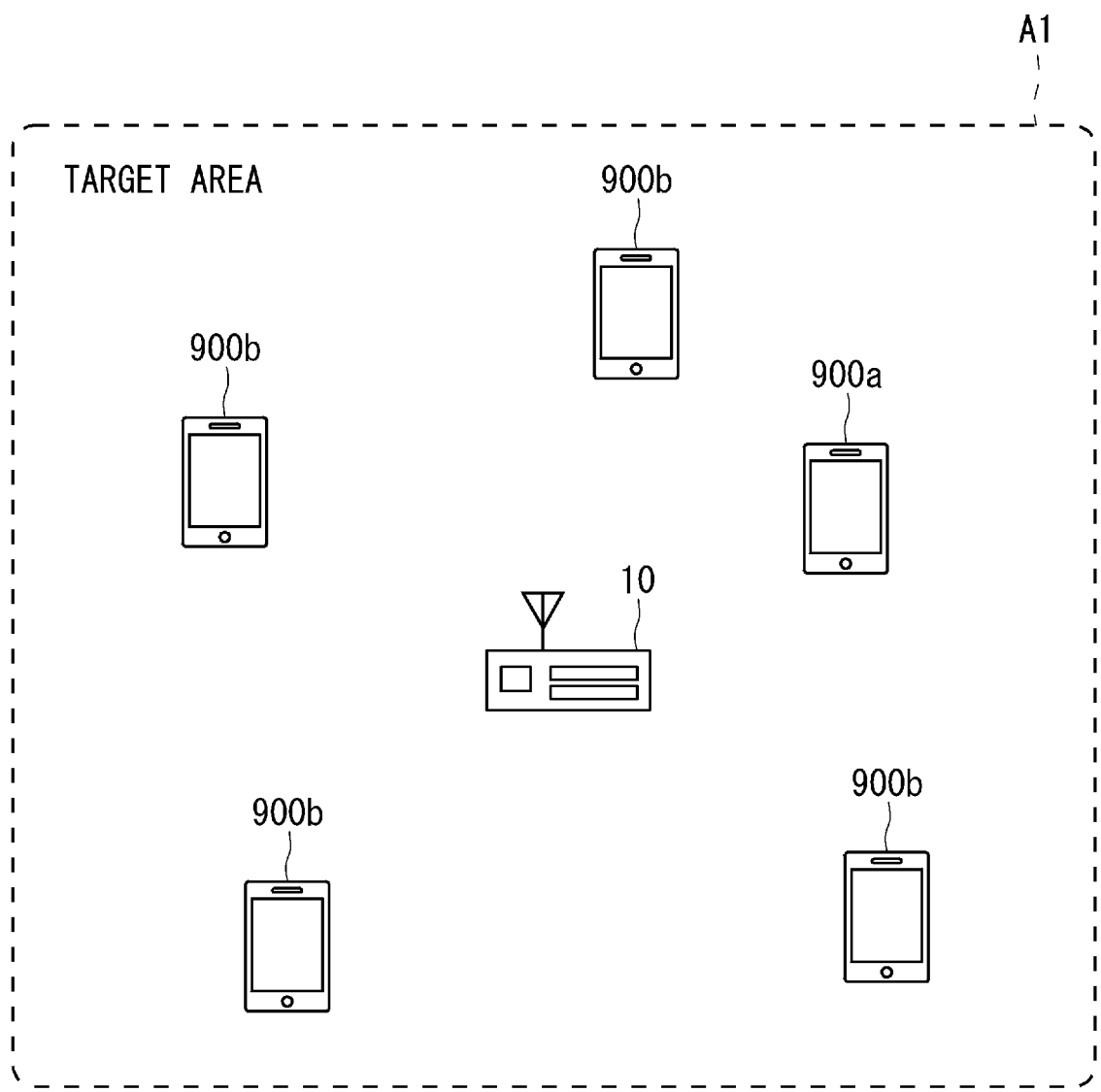
FIG. 6 is a diagram illustrating an example of arrangement of the transmission apparatus recognition system according to the second example embodiment.
Figure 7:
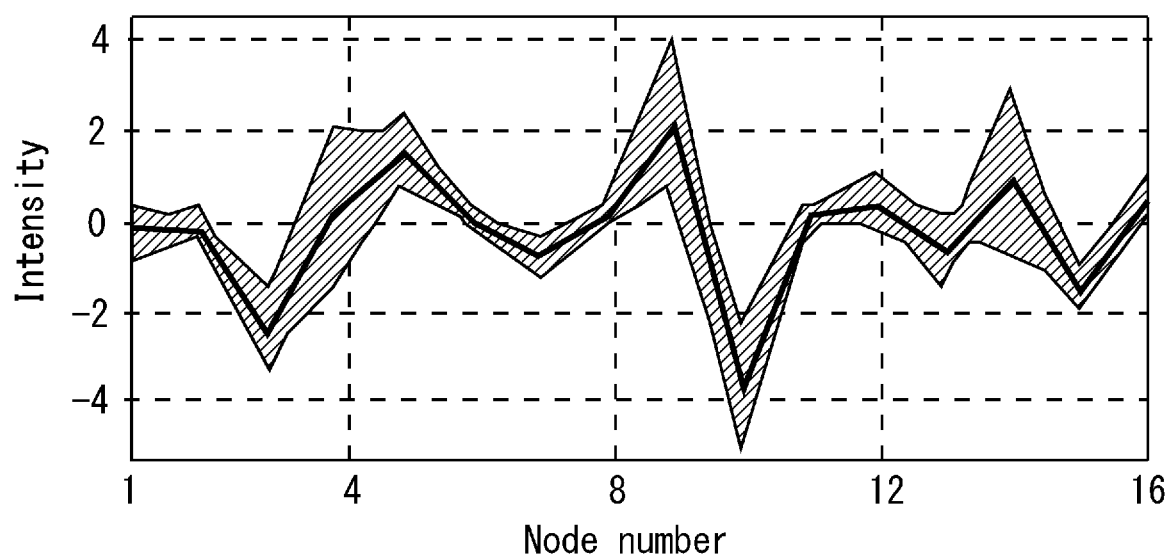
FIG. 7 is a diagram illustrating one example of a cluster being output by a clustering unit in FIG. 5.

Hereinafter, a more specific configuration example of the present example embodiment will be described in detail with reference to FIGS. 5 to 12. First, with reference to FIGS. 5 to 8, an example of a configuration and arrangement of the present system (transmission apparatus recognition system) 10 will be described. FIG. 5 is a block diagram illustrating an example of a functional configuration of the present system 10, and FIG. 6 is a diagram illustrating an example of arrangement of the present system 10. FIG. 7 is a diagram illustrating one example of a cluster output by a clustering unit in FIG. 5 (an example of a sample feature), and FIG. 8 is a diagram illustrating one example of a relationship matrix generated by a matrix generation unit and visualized by a visualization unit in FIG. 5.

The present system 10 illustrated in FIG. 5 includes the functions described the outline in FIG. 4. In other words, the present system 10 performs calculation of a degree of similarity or the like on a sample feature generated by using a learning model based on individual difference of radio waves from a reception signal being received from a signal wirelessly transmitted by a not-illustrated transmission terminal and a template feature, and thereby recognizes the transmission terminal. The template feature can be registered in advance in an internal database. Further, the present system 10 generates additional learning data for updating a learning model for generating the sample feature with respect to a reception signal determined to be unknown or unregistered by recognition, and updates the learning model.

Herein, the individual difference of radio waves and the like will be described. Depending on difference in the specification of the transmission terminal, or depending on variation or the like in the characteristics of an analog circuit mounted on the transmission terminal even when the specifications are the same, individual difference may occur in the radio waves to be transmitted. The present system 10 registers, as a template feature in a database, a feature (as one example, a statistical value of a sample feature generated from a reception signal using a learning model, or the like) of a radio wave transmitted by a transmission terminal for each transmission terminal. Then, upon receiving a radio wave, the present system 10 generates a sample feature of the reception signal using the learning model. The present system 10 specifies a transmission terminal being a transmission source of the received radio wave by recognizing the sample feature with the template feature in the database. For example, in a case of performing calculation of a degree of similarity in recognition, when there is a terminal having a template feature larger than a predetermined threshold value, a transmission terminal being a transmission source of a received radio wave is specified. When there are a plurality of terminals having a template feature larger than a predetermined threshold value, a terminal having a largest template feature may be output as a recognition result, or candidates of equal to or more than two and equal to or less than a predetermined number may be output together with an estimation probability or degree of similarity information.

Recognition of the transmission terminal includes "individual identification" for specifying the individual of the transmission terminal. In addition, specification of the transmission terminal does not specify which individual has transmitted a radio wave, but includes "model identification" for specifying a model that has transmitted the radio wave. Note that, further, it is also possible to include "attribute identification" or the like for specifying an attribute or an application of a transmission terminal, such as a consumer terminal, a business radio apparatus, an interference source, or a specific low power radio. In view of this situation, in the following description, "individual identification", "model identification", and "attribute identification" may be collectively referred to as "radio identification" or "terminal recognition".

The present system 10 need only be able to extract a feature of a received radio wave (received radio signal) by using the learning model, and the transmission terminal does not need to transmit the radio wave to the present system 10 (toward the present system 10). The present system 10 can be used (applied) for various purposes, such as detecting and tracking a suspicious person in an urban area or various facilities (an airport, a shopping mall, and the like), grasping a flow line of a customer in a store or a commercial facility, and admission/exit management to/from a limited area using a radio wave. Needless to say, an application is not limited to that exemplified herein.

The present system 10 can determine an identity of a transmission terminal by using a feature of a radio wave. However, the present system 10 cannot directly determine an owner of the transmission terminal, based on the feature. Thus, a feature of a radio wave used by the present system 10 has anonymity, and the present system 10 can perform processing with consideration given to privacy of each individual.

Hereinafter, each component of the present system 10 illustrated in FIG. 5 will be described.

As illustrated in FIG. 5, the present system 10 can include a receiving unit 111, a radio feature generation unit 112, a learning unit 113, and a recognition unit 130. Further, the present system 10 can include a feature clustering unit 140, a temporary label acquisition unit 150, a matrix generation unit 151, a visualization unit 152, a data generation unit 153, and a label setting unit 154.

The receiving unit 111 is one example of the input unit 1*a* in FIG. 3, and receives a radio wave (radio signal) from a transmission terminal including a transmission terminal to be subjected to radio identification. The receiving unit 111 can be configured including a radio wave sensor for receiving a radio wave. Note that, the number of receiving units 111 included in the present system 10 may be one or more. In other words, the present system 10 may include at least one or more receiving units 111.

Herein, an example of arrangement of the present system 10 including the receiving unit 111 illustrated in FIG. 5 and a transmission terminal will be described with reference to FIG. 6. In the example in FIG. 6, the present system 10 and transmission terminals 900*a* and 900*b* arranged in a target area A1 of terminal recognition by the present system 10 are illustrated. Note that, the transmission terminal 900*a* is a transmission terminal to be recognized by the present system 10, and the transmission terminal 900*b* is a transmission terminal not to be recognized by the present system 10, that is, a transmission terminal whose template feature is not registered. In the present disclosure, when there is no special reason to distinguish between the transmission terminal 900*a* and the transmission terminal 900*b*, the transmission terminals 900*a* and 900*b* are simply referred to as a "transmission terminal 900". Note that, although FIG. 6 illustrates one transmission terminal 900*a* to be recognized, a plurality of transmission terminals 900*a* to be recognized are actually included. In other words, generally, at least one or more transmission terminals 900*a* exist in a field (target area).

Examples of the transmission terminal 900 include a portable terminal apparatus such as a mobile phone (including a so-called smartphone), a game machine, and a tablet terminal, a computer (a personal computer, a notebook personal computer), and the like. Alternatively, the transmission terminal 900 may be an Internet of Things (IoT) terminal that transmits a radio wave, a machine type communication (MTC) terminal, or the like. However, the transmission terminal 900 (including a target of terminal recognition by the present system 10) is not limited to the above example. In other words, in the present disclosure, any apparatus that transmits a radio wave can be a target of terminal recognition by the present system 10 or a target of generation of additional learning data about a learning model generated by the learning unit 113 being described later.

As described above, a radio wave transmitted by the transmission terminal 900*a* does not need to be a radio wave transmitted to the present system 10 (to the receiving unit 111). For example, the receiving unit 111 may receive a radio wave transmitted by the transmission terminal 900 toward a radio communication base station or an access point for a mobile phone or the like, or a radio wave transmitted by the transmission terminal 900 in order to search for a radio communication base station or an access point.

In addition, the present system 10 is assumed to be installed in an environment where an unspecified large number of transmission terminals whose template features are not registered in the database may transmit. The learning data used when the learning unit 113 generates a learning model (the learning model 11*b* in FIG. 4) does not include data of the unspecified large number of transmission terminals whose template features are not registered in the database. Therefore, in such an installation environment, generating, by the learning model, a sample feature with high accuracy with respect to an unknown signal or an unknown feature cannot be expected. Therefore, as a result, decreasing recognition accuracy of a known transmission terminal, and possibility of erroneously recognizing an unknown transmission terminal as a known transmission terminal is increased. In order to solve such a problem, in the present example embodiment, additional learning data for an unregistered transmission terminal is generated, and the learning model is updated.

Returning to the detailed description of each part in FIG. 5. The radio feature generation unit 112 generates a radio feature from a reception signal received by the receiving unit 111. A radio feature used by the present system 10 for recognizing a transmission terminal of a radio wave transmission source can be various features in which an individual difference of the transmission terminal 900 appears.

Examples of the radio feature include, for example, a transient (rising and falling) of a reception signal in the receiving unit 111, power spectrum density of a reference signal portion such as a preamble, and an error vector amplitude of the reception signal. In addition, as the radio feature, for example, an IQ phase (in-phase/quadrature phase) error, an IQ imbalance amount, and the like can be cited. Alternatively, as the radio feature, a feature indicating one or a plurality of a radio frequency offset and a symbol clock error may be used. However, the example of the radio feature herein is not intended to limit a feature used by the present system 10 for specifying a transmission terminal.

The recognition unit 130 can include a sample feature extraction unit 132, a threshold value determination unit 133, a first feature recognition unit 134, a template feature storage unit (template feature storage unit) 135, and an output unit 136.

The recognition unit 130 includes the function of the recognition unit 3*a* in FIG. 3, and performs the recognition determination 11*e* described in FIG. 4. In other words, the recognition unit 130 recognizes a transmission terminal by recognizing a sample feature extracted from a radio feature generated by the radio feature generation unit 112 from a reception signal received by the receiving unit 111 with a template feature registered in advance, and outputs the recognition result. The recognition can be performed, for example, by calculating a degree of similarity between the sample feature and the template feature and comparing the degree of similarity with a recognition threshold value Th1, and in the following, it is assumed that the recognition is performed by calculation of the degree of similarity, but another recognition method can be adopted. The template feature registered in advance is a template feature stored as a database in the template feature storage unit 135.

In this way, the recognition unit 130 performs terminal recognition (individual identification, model identification, and attribute identification), based on the generated feature.

The recognition processing is performed by the first feature recognition unit 134. In addition, output of a result of the recognition by the first feature recognition unit 134 is performed by the output unit 136.

The first feature recognition unit 134 calculates a one-to-L degree of similarity between a sample feature and a template feature registered in advance, compares each of the calculated L degrees of similarity (e.g., similarity score) with the recognition threshold value Th1, and performs recognition. Note that, L is a positive integer. When there is a terminal having a template feature whose degree of similarity is larger than the recognition threshold value Th1 (when data of the terminal exists in the database), the first feature recognition unit 134 outputs the recognition result (ID of a transmission terminal being a transmission source of a specified radio wave, or the like) from the output unit 136. When there are a plurality of terminals having a template feature larger than the recognition threshold value Th1, the first feature recognition unit 134 may output a terminal having a largest template feature as a recognition result, or may output a predetermined number of two or more as a candidate. However, in the calculation or a degree of similarity, it is also possible to conclude that the recognition has succeeded at a stage where the degree of similarity exceeding the recognition threshold value Th1 exists, and terminate the recognition processing.

In order to use for calculating the degree of similarity between the sample feature and the template feature, for example, various methods such as a cosine similarity, a Euclidean score (Euclidean distance), a Mahalanobis distance, a Manhattan distance, and a correlation coefficient can be applied. Needless to say, it is also possible to perform calculation of the degree of similarity by combining a plurality of these methods. In addition, a method other than the method of calculating the degree of similarity exemplified herein can be adopted. Note that, a degree of similarity can be calculated as a similarity score as exemplified in part. In addition, although the description of an example of calculating a degree of similarity is omitted, for example, the technique described in International Patent Publication No. WO2021/070248 or the like can be applied. In addition, the degree of similarity can be output as higher (closer to 1) as the features are similar to each other, and the degree of similarity can be output as lower (closer to 0) as the features are different from each other, and the following description is made on the assumption, but is not limited thereto.

The threshold value determination unit 133 can calculate a following curve, based on a calculation result of a degree of similarity between a sample feature generated from learning data used for learning a learning model (data set having a correct answer label), and a template feature already registered in the template feature storage unit 135. The curve calculated herein can be a curve of a rate of acceptance of others and a curve of a rate of rejection of individuals, and the technique described in, for example, International Patent Publication No. WO 2021/070248 can be applied.

Then, the threshold value determination unit 133 can determine the recognition threshold value Th1 used for threshold value comparison of the degree of similarity between a sample feature and a template feature in the first feature recognition unit 134, based on, for example, a predetermined rate of acceptance of others and a target error rate related to the recognition.

Further, the threshold value determination unit 133 can include a function of setting a clustering threshold value Th2 used for the first clustering processing in the clustering unit 148, which will be described later, according to an operation input by an operator or automatically. In other words, the threshold value determination unit 133 can perform control on the clustering unit 148 to change the clustering threshold value Th2. Thus, by making the clustering threshold value Th2 variable, it is possible to execute the first clustering processing for a plurality of clustering threshold values Th2. Herein, since there is a possibility that the appropriate clustering threshold value Th2 changes every time according to an input unknown signal or an input unknown radio feature, it is useful to make the clustering threshold value Th2 variable even at that point.

The threshold value determination unit 133 outputs the recognition threshold value Th1 to the first feature recognition unit 134, and outputs the clustering threshold value Th2 to the clustering unit 148. Note that, in FIG. 5, for the sake of convenience, the threshold value determination unit 133 is illustrated as not being connected to the first feature recognition unit 134 and the clustering unit 148, but both are connected to the threshold value determination unit 133.

In addition, by combining a plurality of radio features, that is, by making the features higher in dimensions, improvement in recognition accuracy can be expected. On the other hand, there is a risk that a calculation amount of the recognition becomes large or the database becomes large. Therefore, the sample feature extraction unit 132, which will be described later, extracts a sample feature by extracting a lower-dimensional sample feature from a higher-dimensional radio feature generated by the radio feature generation unit 112.

In particular, when a signal is received by the receiving unit 111, the sample feature extraction unit 132 can generate a sample feature from a radio feature by using a learning model. The learning model is a model for extracting a sample feature from a radio feature generated by the radio feature generation unit 112, and is generated by the learning unit 113. The sample feature extraction unit 132 can include the learning model, or can be configured to be accessible to the learning model. In addition, the learning model can also be mounted on the sample feature extraction unit 132, assuming that a learning parameter is set for hardware as a feature extractor.

The learning unit 113 performs machine learning by using learning data in which a correct answer label is added to a radio feature, and generates a learning model. In addition, the learning data used for learning can be learning data about a transmission terminal for which a transmission apparatus as a transmission source is known (a correct answer label is determined), or learning data about a transmission terminal whose template feature is registered. For the generation of the learning model by the learning unit 113, any machine learning and deep learning algorithm such as a support vector machine, boosting, or a neural network can be used. Note that, the algorithm of the support vector machine or the like described above can use a known technique, and therefore description thereof is omitted. In addition, the correct answer label represents a transmission terminal (wireless terminal), and for example, a model name, an individual ID, a serial number, or the like is conceivable. In other words, the correct answer label is information for identifying and specifying a transmission terminal. In machine learning, when a learning model is constructed, a combination of a feature and a correct answer label is given as a learning data set.

In addition, it is desirable that the learning unit 113 causes a learning model to learn with a feature to which an appropriate correct answer label being acquired in advance in an environment where only a sufficient amount of specific transmission terminals transmit radio waves is assigned. In other words, it is desirable to learn in advance a relationship between a transmission terminal and a radio feature of a signal transmitted by the terminal in an ideal environment (an environment where there is no terminal other than the terminal to be learned), and generate a learning model. For example, in the example in FIG. 6, a learning model is generated by using a radio wave (signal) transmitted by the transmission terminal 900$a$ in an environment where the transmission terminal 900$b$ does not exist.

When the sample feature extraction unit 132 includes a feature extractor, a learning parameter of the generated learning model is set in the feature extractor. The learning parameter can be, for example, a network configuration, a weight, a bias, or the like, but may be a parameter representing a learning model.

The feature clustering unit 140 is one example of the first clustering unit 1$c$ in FIG. 3, and can include a sample feature temporary holding unit 146, a second feature recognition unit 147, and a clustering unit 148.

The sample feature temporary holding unit 146 is a temporary holding unit that temporarily holds a sample feature being determined to be unknown or unregistered by recognition in the recognition unit 130. In other words, the sample feature temporary holding unit 146 temporarily stores a sample feature which deviates from the recognition in the first feature recognition unit 134 (all degrees of similarity with a registered template feature are smaller than the recognition threshold value Th1).

The second feature recognition unit 147 recognizes the temporarily stored sample features with each other, and outputs the recognition result to the clustering unit 148. For example, the second feature recognition unit 147 calculates a degree of similarity between the sample features held in the sample feature temporary holding unit 146 every predetermined period.

In addition, various degrees of similarity such as a cosine similarity, a Euclidean score, a Mahalanobis distance, a Manhattan distance, and a correlation coefficient can be applied to the degree of similarity calculated by the second feature recognition unit 147. Needless to say, it is also possible to perform calculation of a degree of similarity by combining a plurality of these. In addition, a method other than the method of calculating the degree of similarity exemplified herein can be adopted. Note that, the degree of similarity can also be calculated as a similarity score. Note that, similarly to a case of the first feature recognition unit 134, the second feature recognition unit 147 can also perform recognition between the sample features by a method other than the calculation of a degree of similarity.

The clustering unit 148 performs the first clustering processing, based on a degree of similarity between sample features output from the second feature recognition unit 147, and groups the sample features whose degree of similarity is equal to or greater than the clustering threshold value Th2. Needless to say, there may be a plurality of groups, i.e., clusters. Specifically, in the first clustering processing, clustering is performed in such a way that a sample feature having a degree of similarity of the clustering threshold value Th2 or more becomes the same cluster, and a sample feature having a degree of similarity of the clustering threshold value Th2 or less becomes another cluster. Then, the clustering unit 148 assigns a cluster number to each cluster, reads the target sample feature from the sample feature temporary holding unit 146, and outputs the read sample feature to the matrix generation unit 151.

The clustering unit 148 acquires a sample feature (or a statistical value of the sample feature) for each cluster in this way, and outputs the acquired sample feature to the matrix generation unit 151. A sample feature for a certain cluster can be output together with an intensity value for a node number, for example, as illustrated in a graph in FIG. 7. Herein, the node number is a number (degree) for identifying a sample feature included in the cluster, and the intensity indicates a value of the feature for each node number for calculating a degree of similarity. In this example, the number of dimensions of a sample feature is 16.

The number of dimensions of a sample feature (the number of types of information) is not considered similarly to the description of the number of dimensions of an unknown radio feature in the first example embodiment. The sample feature can be extracted as a dimensionally compressed, e.g., 16-dimensional value of a last fully-connected layer from a learning model by supervised learning. Note that, at a time of performing supervised learning, learning is performed in such a way as to associate the 16-dimensional value with a correct answer label in the last layer, for example.

In FIG. 7, for convenience, statistical values (e.g., median values, average values, or the like) regarding intensity of a plurality of sample features included in the cluster are depicted and illustrated as a line graph (a thick solid line). In addition, the clustering unit 148 may output intensity values for each of a plurality of sample features included in the cluster, for example. In FIG. 7, for convenience, a hatched area surrounded by a thin solid line is illustrated, and the hatched area includes a graph group of intensity of each sample feature for the number of frequencies of appearance. By visualizing the sample feature (hatched area) of each cluster in this way, it can be used to estimate reliability of the cluster, a distance between different clusters, and the like.

As a specific method of the first clustering processing, not only the clustering method by a degree of similarity comparison as described above, but also a machine learning method such as a k-means method, an x-means method, a vbgmm, or the like has no problem. In addition, in the first clustering processing, a hierarchical clustering method using a group average method, a Ward's method, a minimum distance method, a maximum distance method, or the like may be used.

The temporary label acquisition unit 150 is one example of the estimation information acquisition unit 1$d$ in FIG. 3, and acquires M temporary labels estimated by the estimation apparatus. Each temporary label is associated with a same unknown signal as an unknown signal received by the receiving unit 111 (or an unknown radio feature generated from the unknown signal by any method).

The matrix generation unit 151 is one example of the generation unit 1$e$ in FIG. 3, the visualization unit 152 is one example of a display unit described in the first example embodiment, and the label setting unit 154 is one example of the label setting unit 1$f$ in FIG. 2. Note that, the matrix generation unit 151 and the visualization unit 152 are equivalent to the relationship visualization unit 13$b$ in FIG. 4.

The matrix generation unit 151 inputs a temporary label estimated by the estimation apparatus and a first clustering result being a processing result of the clustering unit 148, and generates a K×M relationship matrix indicating a relationship between the temporary label and the first clustering result. The temporary label and the first clustering result can be associated with each other by an original unknown signal or an original unknown radio feature as a key (common term). The generated relationship matrix can be that, for example, as illustrated in FIG. 8, a frequency value of an unknown signal or an unknown radio feature common to an intersection point of a temporary label and a cluster number is input to the intersection point.

The visualization unit 152 visualizes the generated relationship matrix by displaying on the display unit. This allows an operator to visually recognize the relationship matrix. In addition, the visualization unit 152 can also include a function of displaying, on the display unit, the relationship matrix and the first clustering result, or only the first clustering result. As a result, an operator can visually recognize a degree of similarity with respect to a sample feature included in each cluster, and can confirm reliability of the cluster. The first clustering result can be displayed as, for example, a distribution graph of each cluster, a graph indicating intensity (a degree of similarity) as illustrated in FIG. 7 for each cluster, or the like.

In addition, the feature clustering unit 140 can also make the clustering threshold value Th2 variable, therefore the matrix generation unit 151 can output a plurality of relationship matrices. In other words, the feature clustering unit 140 can be configured in such a way as to execute the first clustering processing for a plurality of times with the clustering threshold value Th2 being different from each other, and acquire a first clustering result for a plurality of times. Then, the matrix generation unit 151 can be configured in such a way as to generate a relationship matrix for each of the first clustering results for a plurality of times.

Note that, an upper limit value of the number of clusters output as the first clustering result in the feature clustering unit 140, that is, an upper limit value of the number of clusters classified in the first clustering processing can be set in advance.

The label setting unit 154 is equivalent to a part of the data generation unit 13c in FIG. 4, and is one example of the label setting unit 1f in FIG. 2. The label setting unit 154 includes an operation unit that accepts an operation input from an operator, and sets a correct answer label to some of K×M intersection points of a relationship matrix according to an operation input. An operator can set the correct answer label for a highly reliable intersection point indicated in the relationship matrix, and thereby, the correct answer label is set for a piece of data associated with the intersection point (which may be a plurality of intersection points). For example, an operator can recognize that the higher a value at the intersection point (e.g., a frequency value such as the number of pieces of data or other statistical value associated to the intersection point), the higher the reliability of the intersection point.

The data generation unit 153 is equivalent to a part of the data generation unit 13c in FIG. 4, and is one example of the data generation unit 1g in FIG. 2. The data generation unit 153 generates additional learning data, based on a correct answer label set for each of some intersection points determined by an operator to be high reliability, and an unknown signal or an unknown radio feature associated with each of the intersection points. The additional learning data are data for updating the learning model of the learning unit 113. One correct answer label can also be set for a plurality of intersection points.

For example, the additional learning data can include data such as an unknown signal associated with a temporary label or a cluster number associated to one or a plurality of intersection points determined to be highly reliable, and a set correct answer label (generated label). In this manner, the data generation unit 153 can generate one set of learning data for each set correct answer label. The one set can include data (such as a raw data set, or data of a statistical value such as an average value, or a median value) acquired from one or a plurality of unknown signals or unknown radio features associated to one or a plurality of intersection points at which a correct answer label is set, and the correct answer label.

The learning unit 113 updates the learning model by executing machine learning, based on the additional learning data, and an original learning data being learning data including second information, which was the learning target data in the original learning model, and a correct answer label associated with a sample feature of a known signal. Herein, even when the original learning data is not input at a time of the update, there may be a case where the learning model can be updated by inputting additional learning data to the learning model in which the original learning data is substantially used.

Figure 9:
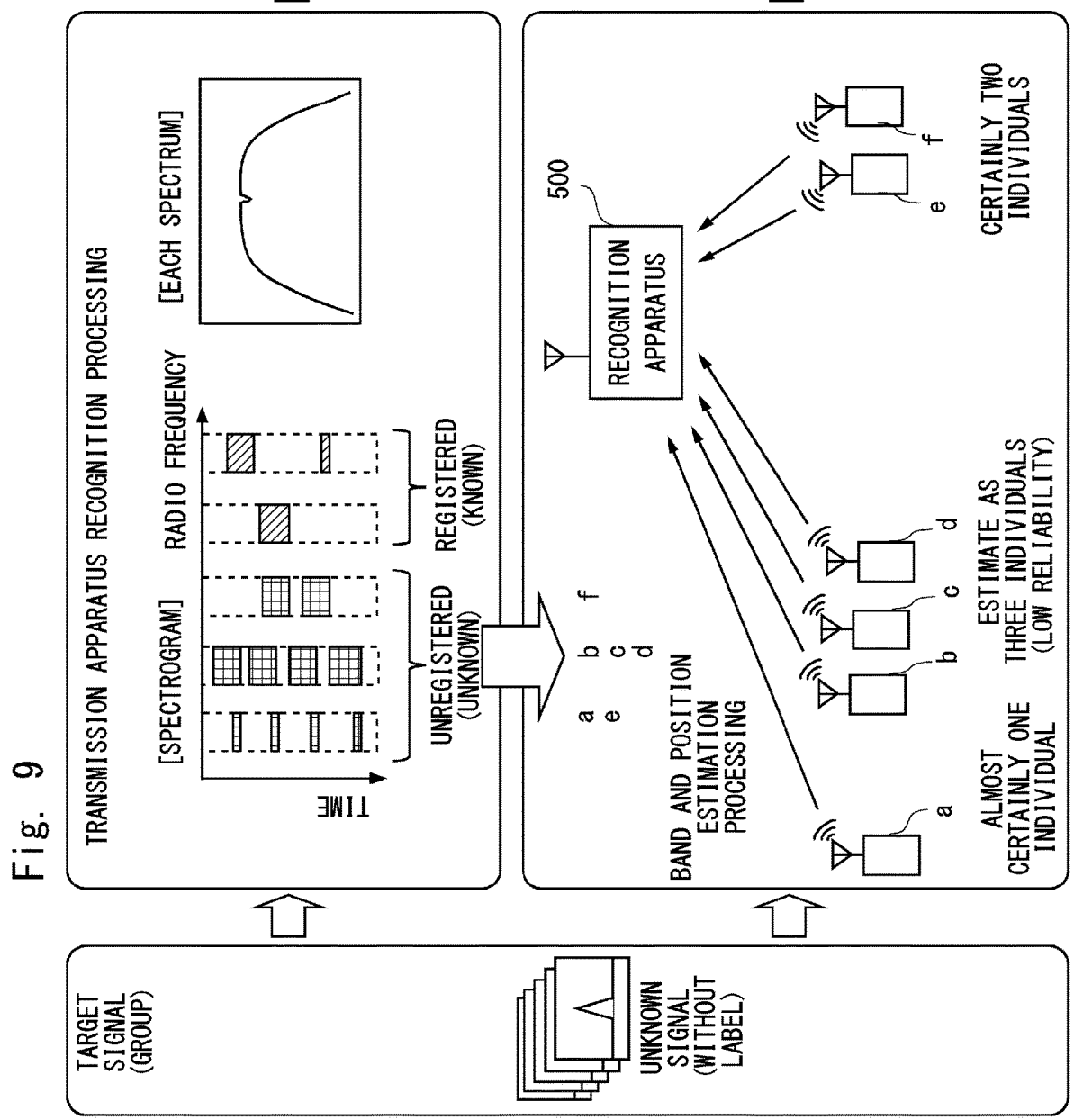
FIG. 9 is a schematic diagram for describing an outline of learning data generation processing performed on an unknown transmission apparatus in the transmission apparatus recognition system in FIG. 5.
Figure 10:
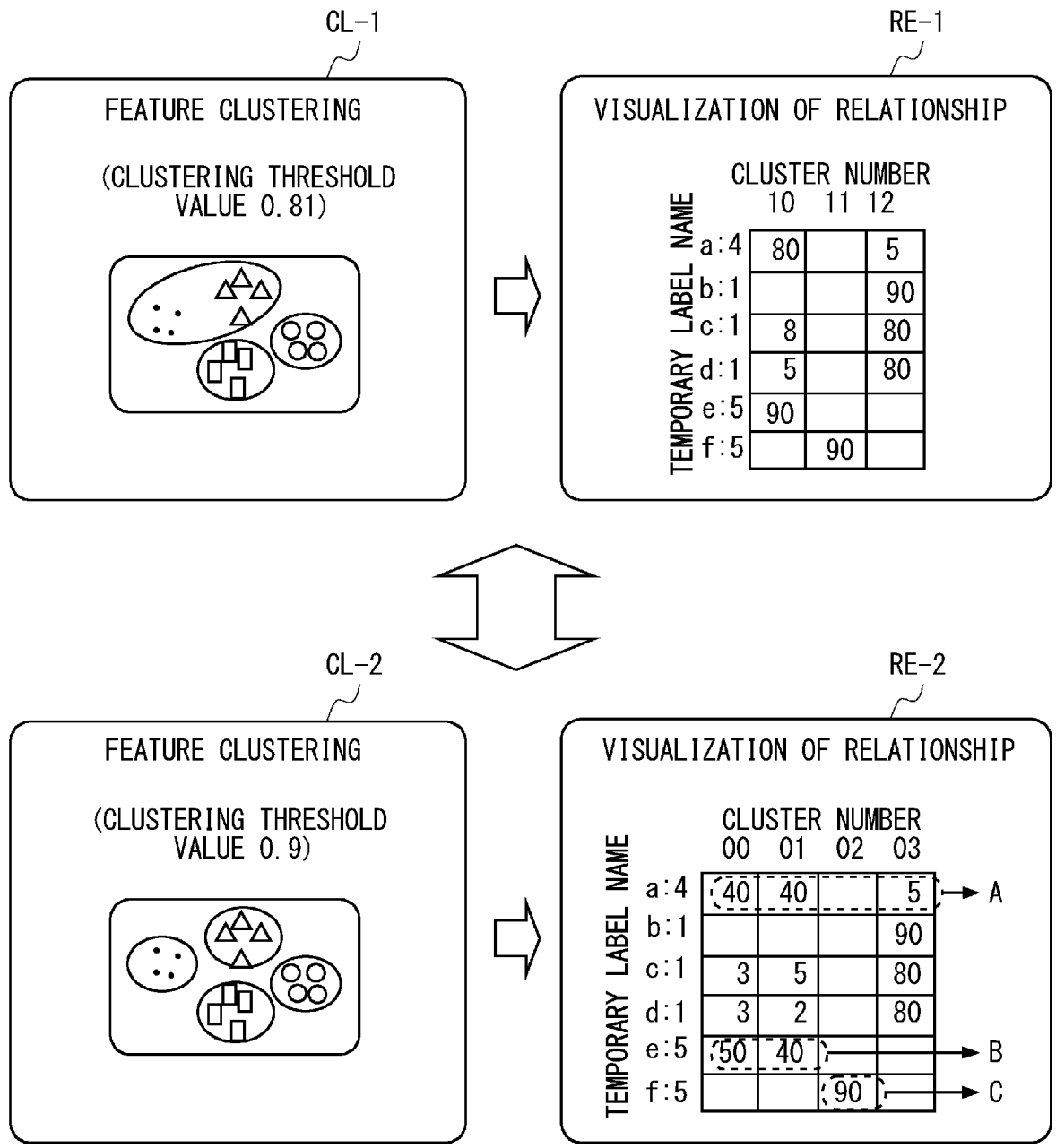
FIG. 10 is a schematic diagram illustrating one example of a result of changing a clustering threshold value in learning data generation processing in FIG. 9.
Figure 11:
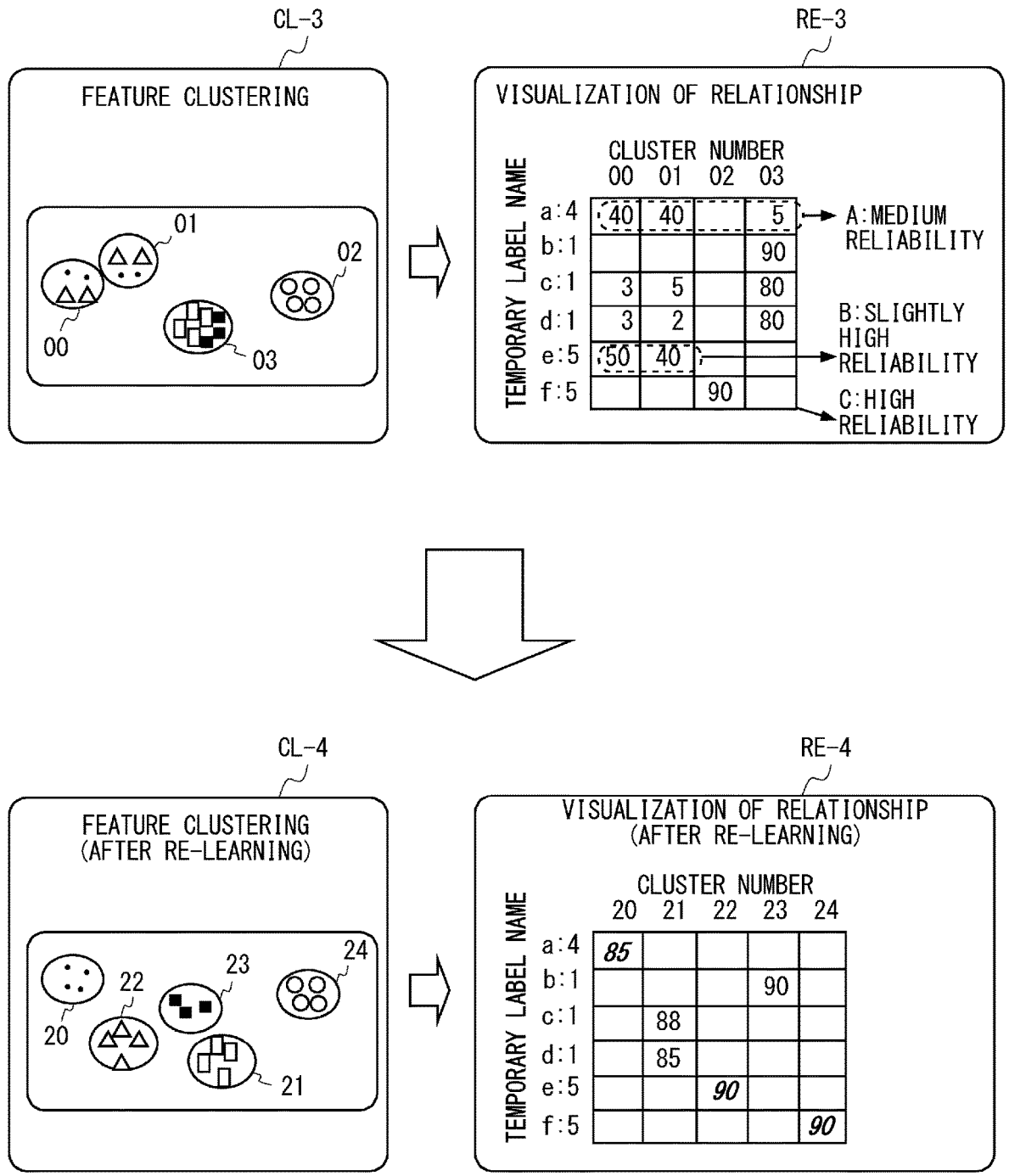
FIG. 11 is a schematic diagram for describing one example of an effect when additional learning data generated as a result of the learning data generation processing in FIG. 9 is used for re-learning.

Next, a specific example will be described with reference to FIGS. 9 to 11. FIG. 9 is a schematic diagram for describing an outline of learning data generation processing performed on an unknown transmission terminal in the present system 10. FIG. 10 is a schematic diagram illustrating one example of a result of changing the clustering threshold value Th2 in the learning data generation processing in FIG. 9, and FIG. 11 is a schematic diagram for describing one example of an effect when additional learning data generated as a result of the learning data generation processing in FIG. 9 is used for re-learning.

FIG. 9 illustrates an example in which the following processing is executed. In other words, an example is cited in which the transmission apparatus recognition processing in the recognition unit 130 of the present system 10 illustrated in FIG. 5, the feature clustering by the feature clustering unit 140, and the visualization processing by the matrix generation unit 151 and the visualization unit 152 are performed on a signal group to be processed. Herein, the target signal group is an unknown signal in a sense that information of a correct answer label is not attached and the signal group is before recognition. In addition, in order to generate a relationship matrix to be subjected to the visualization processing, it is necessary to input a temporary label first, and the temporary label can be generated by a recognition apparatus 500, output to the present system 10, and acquired by the temporary label acquisition unit 150. The recognition apparatus 500 is an apparatus that functions as the above-described estimation apparatus.

The recognition unit 130 can perform recognition processing on a power spectrum density of a reference signal portion of a reception signal, as one example of a radio feature of the reception signal, and such an example is cited in FIG. 9. In FIG. 9, when a spectrogram in which each power spectrum density (each spectrum) is arranged in time series is viewed, an unregistered signal and a registered signal exist in the target signal group. Among them, an unknown signal from an unregistered transmission terminal not being learned becomes a processing target in the feature clustering unit 140. Herein, an example in which an unknown signal is classified into four clusters (cluster numbers 00, 01, 02, and 03) by the feature clustering unit 140 is illustrated.

In addition, in the example in FIG. 9, it is estimated by the recognition apparatus 500 that six signals a to f exist in the same target signal group, that is, six transmission terminals associated to the six signals a to f exist.

Specifically, in the recognition apparatus 500, estimation processing of a radio frequency band and estimation processing of a position is performed, and the signal a is estimated to be a signal from one individual almost certainly (with a slightly high reliability). In addition, in the recognition apparatus 500, the signals b to d are estimated to be signals from three individuals, but the reliability is low, and the signals e and f are estimated to be signals from two individuals certainly (with high reliability). In this case, the recognition apparatus 500 can assign temporary labels a to f to each of the signals a to f, add temporary label reliability information indicating the reliability of each temporary label, and output the information to the present system 10. Note that, herein, an example is cited in which a temporary label is assigned as a result of estimating both the radio frequency band and the position. In this example, the same temporary label is assigned to the same signal or radio feature, based on both an estimation result of the radio frequency band and an estimation result of the position, and when temporary label reliability information is added, the information can be added to the temporary label. In other words, two or more different temporary labels are not assigned to a certain signal or radio feature. An example of the temporary label reliability information will be described later with reference to FIG. 10.

Herein, the temporary labels a to f can also include a temporary label assigned to a known signal transmitted by the transmission apparatus registered in the present system 10. Among the temporary labels a to f received by the present system 10 from the recognition apparatus 500, a signal registered on a present system 10 side can be excluded from a target of generation of a relationship matrix, for example, by comparison of associating signals. However, even though such exclusion is not performed, it is possible to include as is in the relationship matrix and make an operator determine.

The temporary label acquisition unit 150 receives a temporary label from the recognition apparatus 500, and passes the received label to the matrix generation unit 151. The temporary label is received together with a signal or a radio feature associated with the temporary label, and reliability information, and the matrix generation unit 151 generates a relationship matrix indicating a relationship between the temporary labels a to f and the four cluster numbers, based on the signal or the radio feature. The visualization unit 152 displays the generated relationship matrix. The relationship matrix can be generated, for example, as a table illustrated in FIG. 9, the table arranges the temporary label names a to f and the cluster numbers 00 to 03 in a matrix, and a frequency of appearance is indicated at the intersection point. The intersection point is as described with reference to FIG. 4, and for example, a value other than the frequency of appearance can be used.

In addition, the temporary label reliability information can be displayed when an intersection point is selected at a time of display, or can be displayed as "high reliability", "reliability level: 5 (maximum)", or the like in the name of the temporary label, and thereby allowing an operator to recognize the reliability of the temporary label.

As exemplified herein, estimation information can include temporary label reliability information indicating the reliability of the temporary label associated with the temporary label, and the relationship matrix can be generated in a state where the temporary label reliability information is associated with the temporary label. Then, an operator can know the reliability of the temporary label by displaying such a relationship matrix automatically or by an operation of the operator.

In addition, the relationship matrix can also be generated by adding information indicating at least one of the sample feature for each cluster and an inter-cluster distance of each sample feature. The information to be added herein can be calculated by the clustering unit 148 of the feature clustering unit 140. The inter-cluster distance can be, for example, at least one of a Mahalanobis distance, a spatial mapping, a degree of similarity, and an average and/or a variance of each cluster. In addition, the information to be added can be displayed together with the relationship matrix on the display unit, and a timing of the display is not considered such as a time of display of the relationship matrix, or a time of accepting an instruction operation from an operator.

Note that, various examples of a clustering method have been cited, but depending on the clustering method, information (feature information) indicating the sample feature for each cluster to be output, information indicating the inter-cluster distance, and the like may be changed. For example, when a vbgmm is adopted, a Mahalanobis distance or the like can also be output. In addition, in a case of hierarchical clustering, information indicating a dendrogram or the like can also be output.

In the example of the relationship matrix illustrated in FIGS. 9 and 4, for 85 signals or radio features of the temporary label a, 40, 40, and 5 radio features are classified into clusters of each of cluster numbers 00, 01, and 03. In addition, in this example, for 90 signals or radio features of the temporary label b, all radio features are classified into a cluster of cluster number 03. Further, in this example, for 88 signals or radio features of the temporary label c, 3, 5, and 80 radio features are classified into clusters of each of cluster numbers 00, 01, and 03. Further, in this example, for 85 signals or radio features of the temporary label d, 3, 2, and 80 radio features are classified into clusters of each of cluster numbers 00, 01, and 03. Further, in this example, for 90 signals or radio features of the temporary label e, 50 and 40 radio features are classified into clusters of each of cluster numbers 00 and 01. Further, in this example, for 90 signals or radio features of the temporary label f, all radio features are classified into a cluster of the cluster number 02.

An example in which an operator sets a correct answer label in the example in FIG. 9 will be described with also reference to FIG. 10. FIG. 10 illustrates an example of change of the clustering threshold value Th2 and change of the relationship matrix associated therewith.

An operator sets a correct answer label in data associated with a highly reliable intersection point indicated in the relationship matrix. Needless to say, the setting of the correct answer label may not be performed at all when there is no intersection point with high reliability. An operator can determine that the higher a value (e.g., a frequency value such as the number of data associated to the intersection point or other statistical value) at an intersection point, the higher the reliability of the intersection point. In addition, an operator can determine whether an intersection point has high reliability, based on the temporary label reliability information assigned to the temporary label.

In addition, by comparing a plurality of relationship matrices in which the clustering threshold value Th2 is changed, an operator can also determine whether the intersection point has high reliability. Herein, the clustering threshold value Th2 can be determined with reference to, for example, the recognition threshold value Th1 when recognizing a sample feature and a template feature. For example, the clustering threshold value Th2 can be equivalent to the recognition threshold value Th1, and can vary, for example, between 0.8×Th1 and 1.2×Th1. In this example, a signal of the temporary label a is a slightly high reliable signal being estimated to be "almost certainly one individual" as a result of the estimation of the radio frequency band and the position. An operator who has confirmed the information determines that the reliability of the temporary label a is higher than the reliability of the first clustering result, and can set a correct answer label A in such a way that the temporary label a becomes the correct answer label for a group of intersection points in a frame indicated by A. Note that, since a frequency of the cluster of the cluster number 02 is 0 for the correct answer label A, a result is the same even though the correct answer label A is set except for the intersection point of the cluster of the cluster number 02.

An operator can determine lowness of reliability of the first clustering result by confirming that, for example, two clusters are integrated into one cluster as a result of slightly lowering the clustering threshold value Th2, or the like.

An example of the temporary label reliability information and the reliability of the first clustering result will be described with reference to FIG. 10. In FIG. 10, beside each temporary label, any one of values 1 to 5 indicating the reliability of the temporary label is added as the temporary label reliability information. In this example, 1 indicates the lowest reliability and 5 indicates the highest reliability. The temporary label reliability information can be expressed as such a level, or expressed in terms such as high, medium, or low meanings that are easy to understand, but the expression method or a rank of the reliability is not considered. Needless to say, a display method of the temporary label reliability information is not limited to the example.

The temporary label reliability information may not be added to the temporary label, but by adding and displaying together with the relationship matrix, an operator can accurately grasp the reliability of the temporary label, that is, estimation accuracy in the estimation apparatus. As a result, it is possible to avoid a situation in which a correct answer label is erroneously assigned by mistaking that the reliability is high even though it is actually wrong, it is possible to surely assign a correct answer label for each correct model/individual, and it is possible to improve the recognition accuracy of an unknown signal.

In addition, FIG. 10 illustrates the first clustering result (feature clustering result) and the relationship matrix generation result when the clustering threshold value Th2 is changed between 0.81 and 0.9. Note that, the clustering threshold value Th2 in this example is determined as 0.9×Th1 and 1.0×Th1 in a case where the recognition threshold value Th1 is 0.9.

When the clustering threshold value Th2 is 0.9, it is classified into four clusters as illustrated by a feature clustering result CL-2 and a relationship matrix RE-2. Note that, FIG. 9 also illustrates a state indicated by the feature clustering result CL-2 and the relationship matrix RE-2. On the other hand, when the clustering threshold value Th2 is 0.81, it is classified into three clusters as illustrated by a feature clustering result CL-1 and a relationship matrix RE-1.

The example in FIG. 10 illustrates that two clusters (cluster numbers 00 and 01) are integrated into one cluster (cluster number 10) when the clustering threshold value Th2 is lowered from 0.9 to 0.81. In other words, when the clustering threshold value Th2 is 0.9 for each of the temporary label names a, c, d, and e, it is divided into two clusters having the cluster numbers 00 and 01. On the other hand, when the clustering threshold value Th2 is lowered to 0.81 for each of the temporary label names a, c, d, and e, it is integrated into one cluster having the cluster number 10. In this case, it can be determined that the reliability of clustering is low. On the other hand, when the cluster does not change even when the clustering threshold value Th2 is changed, it can be determined that the reliability of clustering is high. As an example, a signal of the temporary label f to be described later will be described. Even though the clustering threshold value Th2 is lowered, an operator can determine that the intersection point (combination) between the temporary label f and the cluster number 02 (cluster number 11), which are one cluster, is a combination of the temporary label and the cluster having high reliability.

In this way, an operator can determine a degree of reliability of clustering by visually recognizing the relationship matrix in which the clustering threshold value Th2 is changed. In order to enable such visual recognition, for example, the feature clustering result CL-1, the relationship matrix RE-1, the feature clustering result CL-2, and the relationship matrix RE-2 in FIG. 10 can be displayed on the display unit. An upper part and a lower part of FIG. 10 may be displayed on the display unit in such a way as to be switchable by an operation of an operator, the whole of FIG. 10 may be displayed on the display unit at a time, or only the feature clustering results CL-1 and CL-2 may be displayed on the display unit. In addition, only the relationship matrices RE-1 and RE-2 in FIG. 10 can be displayed on the display unit.

In addition, in the example in FIG. 9, an operator can know, from the temporary label reliability information, that the signals of the temporary labels b to d are signals that the reliability is "1" and the reliability is low as a result of estimation of the radio frequency band and the position. An operator who has confirmed the information determines that the reliability of the temporary labels b to d are lower than at least the reliability of the feature clustering result, and any of the temporary labels b to d cannot be adopted as a correct answer label. Note that, although not illustrated in FIG. 9, when it is recognized that the reliability of the feature clustering result for the cluster number 03 is high, a correct answer label can be set for three intersection points between the temporary labels b to d and the cluster number 03.

In addition, an operator can know, from the temporary label reliability information, that the reliability of the signals of the temporary labels a and e is slightly high (reliability of "4") and high (reliability of "5"), respectively. Then, an operator can determine that, in the example in FIG. 9, it should certainly be divided into different individuals, that is, two clusters. On the other hand, in the relationship matrix RE-2, it is classified into the same cluster in the cluster numbers 00 and 01 as the result of the feature clustering. An operator can know, from the result, that the reliability of the feature clustering is low. Herein, the fact that the reliability of the feature clustering with respect to the unknown signal is low means that the reliability of the learning model with respect to the unknown signal is low.

In addition, an operator can know, from the temporary label reliability information, that the reliability of the signal of the temporary label e is high. Then, an operator can determine, by having high reliability, that it is certainly the same individual as a result of estimation of the radio frequency band and the position, that is, should be divided into one cluster. On the other hand, in the relationship matrix RE-2, it is classified into the cluster number 00 and the cluster number 01 separately as the result of the feature clustering. Therefore, an operator can know, from the result, that the reliability of clustering is low. An operator who has confirmed the information determines that the reliability of the temporary label e is higher than the reliability of the feature clustering, and can set a correct answer label B in such a way that the temporary label e becomes the correct answer label for a group of intersection points in a frame indicated by B.

However, the relationship matrix RE-1 indicates that the temporary label e is integrated into one cluster as a result of performing the feature clustering by lowering the clustering threshold value Th2 to 0.81. Therefore, it can be said that the reliability of the feature clustering result for the unknown signal is high with the clustering threshold value Th2. Herein, at a time of generating learning data once, the first clustering processing is not performed by making the clustering threshold value Th2 different for each unknown signal. Therefore, the reliability of the feature clustering for the temporary label e should also be determined in consideration of results of other temporary labels, and it should be determined, from the determination result, whether to set a correct answer label. On the other hand, from a viewpoint of generating more pieces of learning data, it is also possible to set the correct answer label in a state where the clustering threshold value Th2 is set to 0.81 for the temporary label e. For example, when data of an unknown signal or unknown radio feature can be corrected in such a way as to fill the difference between 0.81 and 0.9 with respect to the clustering threshold value Th2, the correct answer label and the data can be generated as one set of the learning data.

In addition, an operator can know, from the temporary label reliability information, that the reliability of the signal of the temporary label f is high. Then, an operator can determine, by having high reliability, that it is certainly the same individual as a result of estimation of the radio frequency band and the position, that is, should be divided into one cluster. In addition, the signal of the temporary label f is classified into one cluster (cluster number 02, 11) even though the clustering threshold value Th2 is lowered, therefore it can be said that the reliability of clustering is also high. In other words, an operator can determine that the intersection point (combination) between the temporary label f and the cluster number 02 (cluster number 11) is a combination of the temporary label and the cluster having high reliability associated to one-to-one. An operator who has confirmed the information determines that the reliability of the temporary label f and the reliability of the feature clustering result are also high, and can set a correct answer label C in such a way that the temporary label f becomes a correct answer label only for the intersection point (cell) in a frame indicated by C.

The data generation unit 153 generates additional learning data in which the correct answer label C is added to only the data having high reliability in this manner. Specifically, the data generation unit 153 generates additional learning data for updating the learning model 11b, based on the correct answer label C, and the unknown signal or unknown radio feature associated with the associating intersection point. When an operator determines that the reliability of the temporary labels a and e is also high, the temporary labels a and e are similarly set as correct answer labels A and B, respectively, and additional learning data is generated based on the unknown signal or the unknown radio feature associated with the associating intersection point. In this case, as a result, a total of three sets of additional learning data can be generated for the correct answer labels A, B, and C. Herein, an operator can generate additional learning data for only the correct answer label C for the purpose of acquiring certain learning data, and can generate additional learning data for the correct answer labels A, B, and C for the purpose of acquiring a large number of pieces of learning data.

In addition, herein, although an example of setting a correct answer label for an unknown signal or an unknown radio feature lower than the recognition threshold value Th1 has been cited, the correct answer label can also be set for a signal (i.e., a known signal) or a radio feature thereof higher than the recognition threshold value Th1. This makes it possible to increase the learning data to which a correct answer label is assigned. Note that, in this case, there is a high possibility that the temporary label is set as the correct answer label.

Then, by performing re-learning by using the additional learning data generated in this way, for example, the following effect is acquired. FIG. 11 illustrates a feature clustering result CL-3 and a relationship matrix RE-3 before re-learning, and a feature clustering result CL-4 and a relationship matrix RE-4 after re-learning.

It is assumed that, before re-learning, in a case where the feature clustering result CL-3 is acquired and the relationship matrix RE-3 is generated, the correct answer labels A, B, and C are set for the temporary labels a, e, and f as described in FIG. 10, and additional learning data is generated. Then, a result of performing re-learning, based on the additional learning data, is indicated by, for example, the feature clustering result CL-4 and the relationship matrix RE-4.

At a time of assigning the correct answer label before re-learning, the temporary labels a, e, and f have slightly high reliability (reliability of "4"), high reliability (reliability of "5"), and high reliability (reliability of "5"), respectively, as described in FIG. 10. Then, at this point in time, it can be said that the reliability in consideration of the feature clustering results for the intersection points indicated by A, B, and C is medium reliability, slightly high reliability, and high reliability, respectively.

On the other hand, by re-learning, as illustrated in, for example, the feature clustering result CL-4 and the relationship matrix RE-4, it is possible to improve recognition accuracy with respect to an unknown signal. In the relationship matrix RE-4, the temporary labels a, e, and f are re-learned with the correct answer labels. Therefore, it can be said that the feature clustering results of the temporary labels a, e, and f are one-to-one, and extraction accuracy of a sample feature for the unknown signal associated to the temporary labels can be improved. The increasing in the extraction accuracy of the sample feature means that it can be accurately recognized by registering a template feature of the sample feature, and therefore it can be said that the recognition accuracy of the signals associated to the temporary labels a, e, and f is increased by re-learning.

Furthermore, an important point is that the relationship matrix RE-4 after re-learning also has a one-to-one relationship with the feature clustering result for the temporary label b, which indicates that the recognition accuracy of an unknown signal is improved. Specifically, the estimation result of whether the signals of the temporary labels b, c, and d before re-learning indicate three transmission terminals has low reliability, and there is a risk that the recognition accuracy is low in the learning model as it is. On the other hand, the signals of the other temporary labels a, e, and f are added and re-learned, and thereby the temporary label b is classified into one cluster. This means that, when each of the signals of the temporary labels b, c, and d are actually signals from one transmission terminal, it can be said that the recognition accuracy with respect to the unknown signal is improved.

As described above, in the present system 10, by visualizing a relationship between a feature clustering result of transmission terminal recognition and a temporary label estimated by the estimation apparatus as a different means, labeling with high reliability becomes possible, and learning using a signal of an unknown transmission terminal becomes possible. As a result, recognition accuracy can be improved in the present system 10.

In addition, the present system 10 can be configured in such a way as to perform the above-described processing on an unknown signal that can be currently received, and notify an operator that generation of further additional learning data is unnecessary when, for example, a one-to-one association can be detected.

Figure 12:
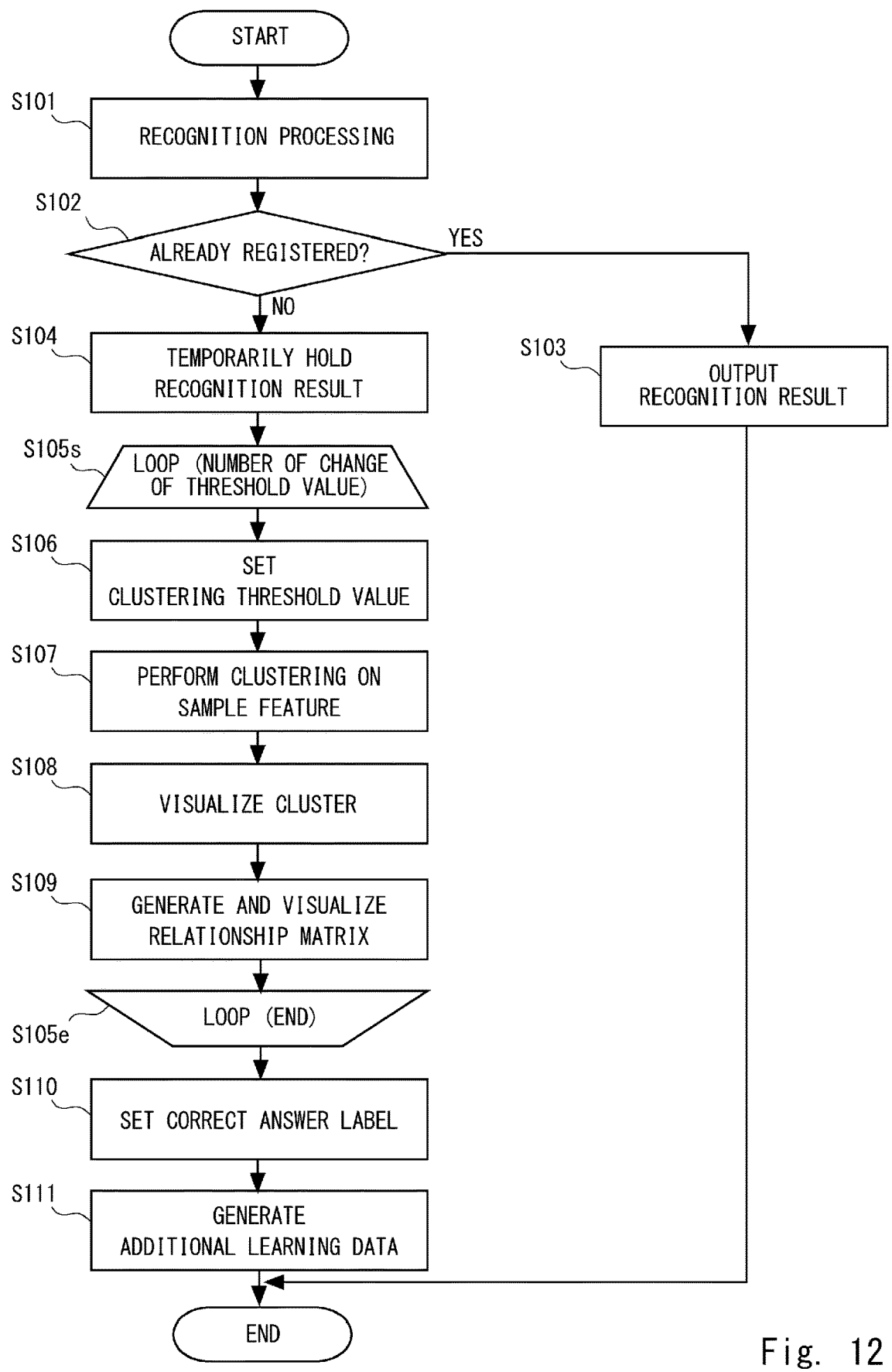
FIG. 12 is a flow chart for describing a processing example in the transmission apparatus recognition system in FIG. 5.

Next, an example of processing and effects of the present system 10 will be described with reference to FIG. 12. FIG. 12 is a flow chart for describing a processing example in the present system 10.

In the present system 10, the receiving unit 111 receives a signal transmitted from the transmission terminal, the radio feature generation unit 112 generates a radio feature from the signal, and the recognition unit 130 performs recognition processing (step S101). In the recognition processing, first, the sample feature extraction unit 132 extracts a sample feature from the radio feature by using a learning model. In the recognition processing, the first feature recognition unit 134 then calculates a degree of similarity between the sample feature and a template feature stored in the template feature storage unit 135, compares the degree of similarity with the recognition threshold value Th1, and thereby performs recognition.

The first feature recognition unit 134 determines whether registration has been completed as a result of the recognition processing (step S102), outputs the recognition result from the output unit 136 in a case of YES, that is, in a case of a registered sample feature (step S103), and ends the processing. When there is a template feature whose degree of similarity is larger than the recognition threshold value Th1, the first feature recognition unit 134 determines that the recognition has succeeded, and causes the output unit 136 to output the recognition result including an ID of the transmission terminal being a transmission source of the radio wave, or the like. On the other hand, in a case of NO in step S102, that is, in a case of an unregistered sample feature, processing of steps S104 to S111 is executed. Note that, in the processing after step S102, the processing is executed related to all the unregistered sample features. In addition, in the case of NO in step S102, that is, in the case of an unregistered sample feature, it is also possible to output the fact as a recognition result.

In the case of NO in step S102, first, the first feature recognition unit 134 holds a target sample feature as the recognition result in the sample feature temporary holding unit 146 (step S104). Herein, loop processing between steps S105s and S105e is executed for the held sample feature.

In the loop processing, first, a clustering threshold value Th2 is set (step S106). Note that, the clustering threshold value Th2 used at first as an initial setting can be set as already set, and after the next, the clustering threshold value Th2 is changed in such a way as to increase and/or decrease for a predetermined number of times of change, for example, at a predetermined interval. Note that, the number of times of change in the example in FIG. 10 is one time, therefore a total of two relationship matrices are generated in step S109 to be described later.

In addition, since the clustering threshold value Th2 is a threshold value of clustering performed for generating additional learning data used for performing recognition, it is set in such a way as not to be a value apart from the recognition threshold value Th1. Therefore, the clustering threshold value Th2 can be set in a range of ±10% or a range of ±5% of the recognition threshold value Th1, for example.

Next, the feature clustering unit 140 performs first clustering processing on the sample feature by using the clustering threshold value Th2 being set in step S106, and acquires a feature clustering result (step S107). The first clustering processing can be performed by the second feature recognition unit 147 and the clustering unit 148, for example, as described above.

Thereafter, the visualization unit 152 visualizes the feature clustering result in a graph format such as the relationship matrix RE-3 (step S108). Next, the matrix generation unit 151 generates a relationship matrix indicating a relationship between information of a temporary label being an estimation result in the estimation apparatus, and the feature clustering result, transfers the generated relationship matrix to the visualization unit 152, and displays the relationship matrix (step S109). As a result, the loop processing described above is completed.

Next, an operator confirms the information visualized by the visualization unit 152, and examines whether there is an intersection point where a correct answer label may be set, that is, a highly reliable intersection point. Herein, an operator can recognize reliability of the temporary label from temporary label reliability information, performance of the estimation apparatus grasped in advance, or the like, at a time point of receiving the temporary label. On the other hand, since an operator is in a state where he/her does not know reliability of the feature clustering, the reliability of the feature clustering may not be grasped only by the relationship between the temporary label and the feature clustering result.

Therefore, in the present system 10, in the above-described loop processing, it is configured in such a way as to be possible to make an operator confirm the feature clustering result while changing the clustering threshold value Th2. As a result, an operator can grasp the reliability of the feature clustering, and select at a time of setting the correct answer label, therefore it can be said that the reliability can be increased. In addition, as described above, the clustering threshold value Th2 has an appropriate value that differs depending on an unknown signal as a target. However, an operator can recognize that the appropriate clustering threshold value Th2 is set, for example, from at least one of a relationship with the temporary label and the temporary label reliability information. From such a viewpoint, it can be said that, by configuring the clustering threshold value Th2 to be variable, the reliability of the feature clustering can be increased.

As a result of the examination, an operator performs, on the label setting unit 154, an operation of setting the correct answer label for an intersection point or an intersection point group for which it is determined that the correct answer label may be set, and the label setting unit 154 sets the correct answer label according to the operation (step S110). Finally, additional learning data is generated based on the set correct answer label, and data of an unknown signal or an unknown radio feature associated with the intersection point or the intersection point group (step S111), and the processing is terminated.

In addition, step S106 is assumed that the clustering threshold value Th2 is automatically changed for the predetermined number of times of change, but is not limited thereto. For example, change of the clustering threshold value Th2 can be performed in such a way as to increase and/or decrease at a predetermined interval until there is a variation in the feature clustering result, instead of performing for a predetermined number of times of change. Herein, it can be automatically determined that there is a variation in the feature clustering result according to a predetermined determination criterion. The predetermined determination criterion can refer to, for example, until there is a variation in the number of clusters, until there is a variation in the number of clusters associated to at least one of the temporary labels, until there is a variation in the number of clusters associated to a temporary label for which predetermined reliability is indicated, or the like. In addition, the clustering threshold value Th2 can be performed change until there is a variation in the feature clustering result as a limit within a predetermined number of times of change.

In addition, for example, it is also possible to request, of an operator, a change operation of the clustering threshold value Th2 for a predetermined number of times of change or until there is a variation in the clustering result, and perform the change in response to the change operation. Alternatively, in step S106, it can also be performed by an operator performing an operation of inputting or selecting the clustering threshold value Th2 every time. In this case, it is possible to exit from the loop processing at a stage when there is no new setting operation of the clustering threshold value Th2 from an operator, and setting of the correct answer label considered to be necessary is completed. Alternatively, after the correct answer label is set for a certain intersection point, it is also possible that the processing of step S106 and the subsequent steps is performed again by change operation of the clustering threshold value Th2 from an operator.

In addition, when the correct answer label can be set in steps S110 and S111, and additional learning data based on the correct answer label can be generated, a flow of processing is not limited to that described in FIG. 12. For example, in a case where the reliability of the feature clustering result is not emphasized in the examination at a time of setting the correct answer label, or in a case where the examination can be performed only by confirming the relationship matrix, the visualization processing of the cluster in step S108 can be omitted.

With the above-described configuration, the present system 10 can generate additional learning data in which an operator has performed accurate labeling, based on a result of confirming a relationship matrix, and can re-learn by using the additional learning data. Therefore, according to the present system 10, it is possible to improve recognition accuracy of an unknown transmission terminal unrelated to a transmission terminal added as the learning data. For example, according to the present system 10, an effect of improving mis-recognizing rate after re-learning by about 15% from the mis-recognizing rate before re-learning can be expected.

In addition, in the example described based on FIGS. 5 to 12, description is made on an assumption that the recognition apparatus 500 generates estimation information by using a predetermined estimation method, but is not limited thereto. For example, in a case where improvement in recognition accuracy is not observed even with such a method, or for a purpose of performing verification, the present system 10 can adopt the following alternative configuration example 1. In the alternative configuration example 1, the estimation method is changed in such a way that the estimation information is generated by using a new estimation method or adding a new estimation method in the recognition apparatus 500. As a result, a target for setting a correct answer label can be further narrowed down, can improve reliability, or can be used at a time of verification.

In the alternative configuration example 1, the present system 10 may be connected to the recognition apparatus 500 in such a way as to perform a change instruction of the estimation method to the recognition apparatus 500 according to an instruction from an operator, for example, and the recognition apparatus 500 may perform change or addition of the estimation method according to the change instruction, and return the estimation information. For example, first, as described in FIG. 9, the estimation information as a result of estimation of a band and a position by the recognition apparatus 500 is output, and when a change instruction is received from the present system 10, the estimation method is changed as follows. In other words, in response to the change instruction, the recognition apparatus 500 returns the estimation information as a result of estimation by a transmission power estimation function, or the estimation information as a result of estimation by an estimation function of a band and a position and the transmission power estimation function. Herein, the estimation method before and after change can include at least one of the functions listed as the function of the estimation unit 12. In addition, clustering by band estimation may be further performed for a cluster for which reliability has not been sufficiently acquired by a matrix based on the feature clustering result and position estimation.

In addition, in a configuration in which the correct answer label is set with the feature clustering result and the temporary label based on position estimation, for verification, it is also possible to verify whether the correct answer label has a problem with the feature clustering result and the temporary label based on band estimation. Similarly, for clustering based on the feature clustering result and band estimation, clustering by position estimation may be further performed. In addition, for the clustering based on the feature clustering result and band estimation, it may be verified by clustering based on the feature clustering result and position estimation.

In the alternative configuration example 1, the estimation method is selected from the functions originally included in the recognition apparatus 500, but as an alternative configuration example 2 being a further alternative example, it can be configured in such a way as to input, to the present system 10, the estimation information as a result estimated by a recognition apparatus different from the recognition apparatus 500. As a result, in the alternative configuration example 2 of the present system 10, the relationship matrix can be generated based on both or one of the pieces of estimation information, and the correct answer label can be set. Needless to say, the other recognition apparatus described above may be two or more.

In addition, in the examples described based on FIGS. 5 to 12 and alternative configuration examples 1 and 2, the recognition apparatus 500 receives a signal radio wave, and performs estimation and assigning a temporary label, based on the received signal, but is not limited thereto. As an alternative configuration example 3, the recognition apparatus 500 or the recognition apparatus 500 and the other recognition apparatus described above can also receive an unknown signal from the present system 10 via a wired network or the like.

In other words, it is also possible for the present system 10 to transmit a signal determined to be unregistered in the present system 10 or a radio feature thereof to the recognition apparatus 500 via a wired network or the like, perform estimation for the signal received by the recognition apparatus 500, and assign a temporary label. In this case, the temporary label as a result of being assigned by the recognition apparatus 500 is temporary labels a to f for unknown signals which are regarded as unregistered signals in the present system 10, but also in this case, the number of temporary labels may be the same as the number of clusters, or may be different therefrom.

As described above, the alternative configuration example 3 of the present system 10 can transmit n unknown signals received by the receiving unit 111 or n unknown radio features generated by the radio feature generation unit 112, based on the n unknown signals, to the estimation apparatus such as the recognition apparatus 500. Then, the estimation information acquisition unit 1*d* exemplified by the temporary label acquisition unit 150 can input m pieces of estimation target information by receiving m pieces of estimation target information from the estimation apparatus.

By adopting such an alternative configuration example 3, processing such as generation of a relationship matrix by using the clustering result and the estimation result for the same unknown signal or radio feature can be performed, and information included in the intersection point of the relationship matrix can also be made more accurate information. Note that, all of the alternative configuration examples 1 to 3 can be applied to the first example embodiment which is not limited to including a temporary label in estimation information.

Third Embodiment

Figure 13:
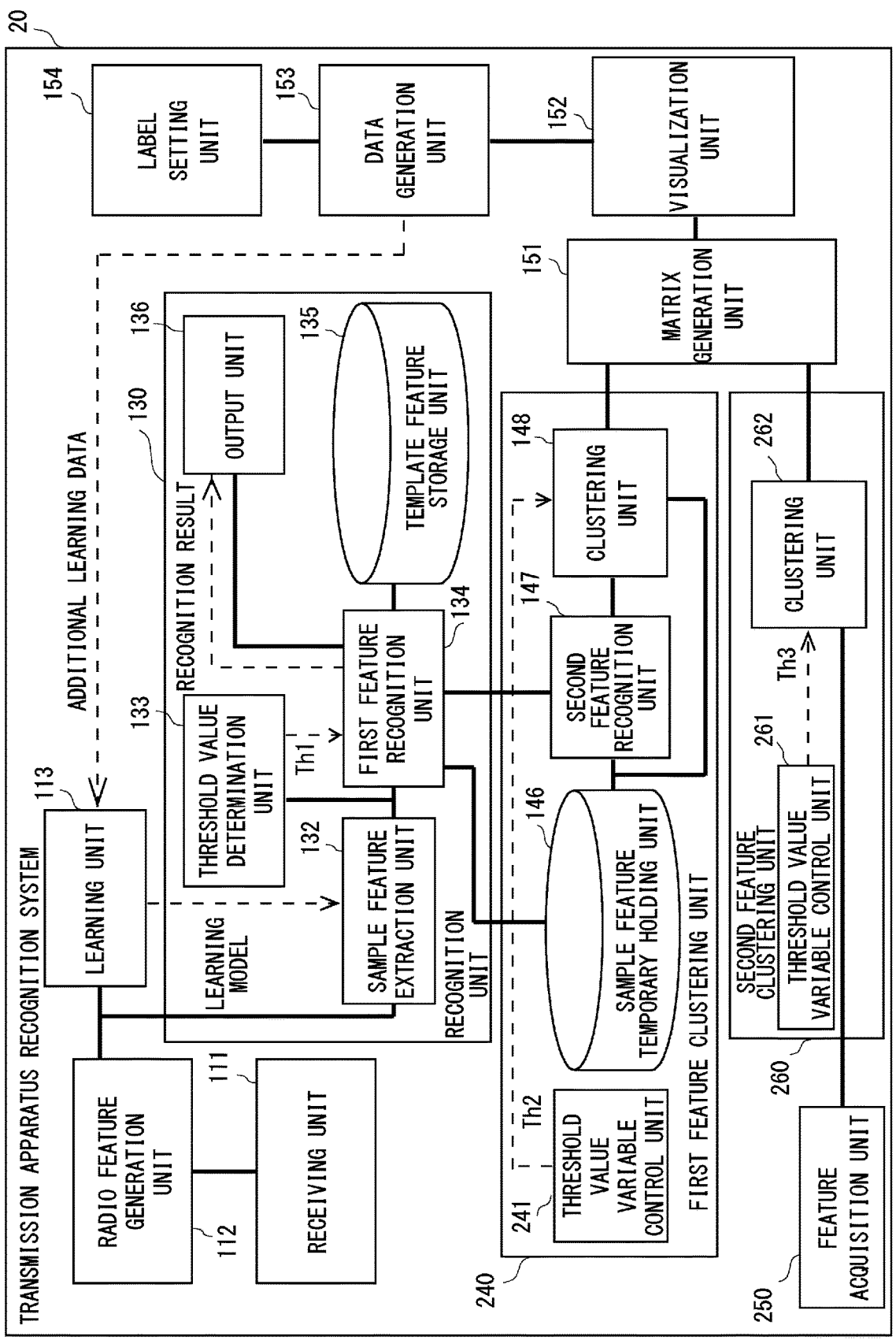
FIG. 13 is a block diagram illustrating an example of a functional configuration of a transmission apparatus recognition system according to a third example embodiment.

A third example embodiment will be described focusing on difference from the second example embodiment with reference to FIG. 13. However, in the third example embodiment as well, various examples described in the first and second example embodiments can be applied. FIG. 13 is a block diagram illustrating an example of a functional configuration of a transmission apparatus recognition system according to the third example embodiment. Note that, components illustrated in FIG. 13, those having the same names as those of the components described in FIG. 5, basically have a similar function, and description of the similar function is omitted except for a part.

In a transmission apparatus recognition system 20 (hereinafter, a present system 20) according to the present example embodiment illustrated in FIG. 13, information to be input is not in a form of a temporary label but in a form of a radio feature before temporary labeling. Then, in the present system 20, a radio feature before temporary labeling is performed clustering similar to a sample feature for recognition, and a relationship matrix is generated. In the present example embodiment, information being equivalent to the temporary label is estimated by clustering from the radio feature before temporary labeling, and it can be said that the present system 20 includes an estimation apparatus.

Therefore, the present system 20 includes a feature acquisition unit 250 and a second feature clustering unit 260 instead of a temporary label acquisition unit 150 in a transmission apparatus recognition system 10. Further, the present system 20 includes a first feature clustering unit 240 instead of a feature clustering unit 140 in the transmission apparatus recognition system 10.

The first feature clustering unit 240 is one example of a first clustering unit 1*c* in FIGS. 1 to 3, and includes a threshold value variable control unit 241, together with a sample feature temporary holding unit 146, a second feature recognition unit 147, and a clustering unit 148. Note that, a threshold value determination unit 133 only sets a recognition threshold value Th1 in a threshold value determination unit 133 in FIG. 5. The threshold value variable control unit 241 is equivalent to a portion for performing setting processing (change control) of a clustering threshold value Th2 in the threshold value determination unit 133.

The feature acquisition unit 250 and the second feature clustering unit 260 are examples of an estimation information acquisition unit 1*d* in FIGS. 1 to 3. The second feature clustering unit 260 is a portion for performing second clustering processing, and can be referred to as a second clustering unit.

The feature acquisition unit 250 inputs m radio features as m pieces of estimation target information. The second feature clustering unit 260 performs the second clustering processing on the m radio features, and acquires M pieces of estimation information as a clustering result (second clustering result). The second clustering processing is performed by the clustering unit 262. The second clustering processing may be exactly the same processing as first clustering processing, may be processing in which only the clustering threshold value Th2 is changed, or may be processing in which an algorithm is changed.

However, a clustering unit 262 outputs information including M temporary labels indicating each of M transmission terminals as M pieces of estimation information. The clustering unit 262 can assign a temporary label to each of clusters as a result of performing the second clustering processing, and assign five temporary labels when classified into five clusters, for example. The temporary label of the present example embodiment differs from a temporary label of the second example embodiment in a generation procedure, but can be said to basically have a similar meaning.

In addition, also in the present example embodiment, the clustering unit 148 can output information indicating at least one of a sample feature for each cluster and an inter-cluster distance of each sample feature, and add the output information to a relationship matrix. Similarly, the clustering unit 262 can also output information indicating at least one of a radio feature (the radio feature acquired by the feature acquisition unit 250) for each cluster and an inter-cluster distance of each radio feature, and add the output information to the relationship matrix.

In addition, estimation information acquired by the clustering unit 262 can also include temporary label reliability information about the temporary label. In the present example embodiment, the feature acquisition unit 250 can acquire reliability information of a radio feature in association with each of the m radio features. The clustering unit 262 can generate temporary label reliability information for one or a plurality of radio features included in each cluster as a result of performing the second clustering processing on the radio feature, that is, for one or a plurality of radio features to which each temporary label is assigned. The temporary label reliability information can be generated based on reliability information acquired by the feature acquisition unit 250. For example, when four radio features are included in a certain temporary label, the clustering unit 262 can calculate the temporary label reliability information for the temporary label by performing statistical processing such as averaging or median calculation on the reliability information associated with the four radio features. Then, the clustering unit 262 can output the temporary label reliability information in association with the temporary label at a time of outputting the temporary label.

In addition, the second feature clustering unit 260 can include a threshold value variable control unit 261 that performs control to change a clustering threshold value Th3 in the clustering unit 262. The threshold value variable control unit 261 can perform processing of setting the clustering threshold value Th3, that is, control of changing the clustering threshold value Th3, on the clustering unit 262 according to an operation input by an operator or automatically. In this way, by making the clustering threshold value Th3 variable, it is possible to perform the second clustering processing for a plurality of clustering threshold values Th3. Herein, since the appropriate clustering threshold value Th3 may change every time according to an unknown signal or an unknown radio feature to be input, it is useful to make the clustering threshold value Th3 variable even at that point.

A matrix generation unit 151 and each of units for performing processing at a subsequent stage are similar to those of the transmission apparatus recognition system 10 in FIG. 5. Briefly described that, in the present system 20, a relationship matrix is generated based on the temporary label as the second clustering result, or the temporary label and the temporary label reliability information, and the first clustering result in the clustering unit 148. In addition, a display example of the first clustering result, a display example of the second clustering result (temporary label, or the like), and a display example of the relationship matrix can also be applied as exemplified in the second example embodiment. Then, in the present system 20, a correct answer label is set by an operator, based on the relationship matrix, and additional learning data about the correct answer label is generated.

According to the present example embodiment, in addition to the effect of the second example embodiment, even when there is no function of assigning a temporary label in the estimation apparatus, or even when the temporary label assigned in the estimation apparatus is difficult to be applied because it does not meet a criterion of the present system 20, the temporary label can be assigned in the present system 20. Therefore, according to the present example embodiment, in addition to the effect of the second example embodiment, it can be said that versatility of an apparatus which can be adopted as the estimation apparatus can be improved.

In addition, in the present system 20, since it is possible to know whether the number of clusters changes or the like by making the clustering threshold value Th2 variable, it is possible for an operator to confirm reliability of a first clustering result and set a correct answer label with high reliability. In addition, by also making the clustering threshold value Th3 variable, it becomes possible to set a correct answer label with higher reliability. In addition, it is also possible that a computer recognizes whether the number of clusters of the temporary label is changed by automatically raising or lowering for at least one of the clustering threshold value Th2 and the clustering threshold value Th3, and an appropriate threshold value is automatically set.

Note that, in the present system 20, the threshold value variable control unit 241 is not essential, and the threshold value determination unit 133 can change the clustering threshold value Th2 similarly to the second example embodiment. However, similarly to the second example embodiment, according to the present example embodiment, a configuration in which the clustering threshold value Th2 cannot be changed is not excluded. In addition, in the present system 20, the threshold value variable control unit 261 is not essential similarly.

In addition, in the present example embodiment, the present system 20, that is, one example of the transmission apparatus recognition system has been described, but the present example embodiment can also be implemented as one example of a learning data generation system in FIG. 1 or one example of a learning system 2 in FIG. 2.

Fourth Embodiment

Figure 14:
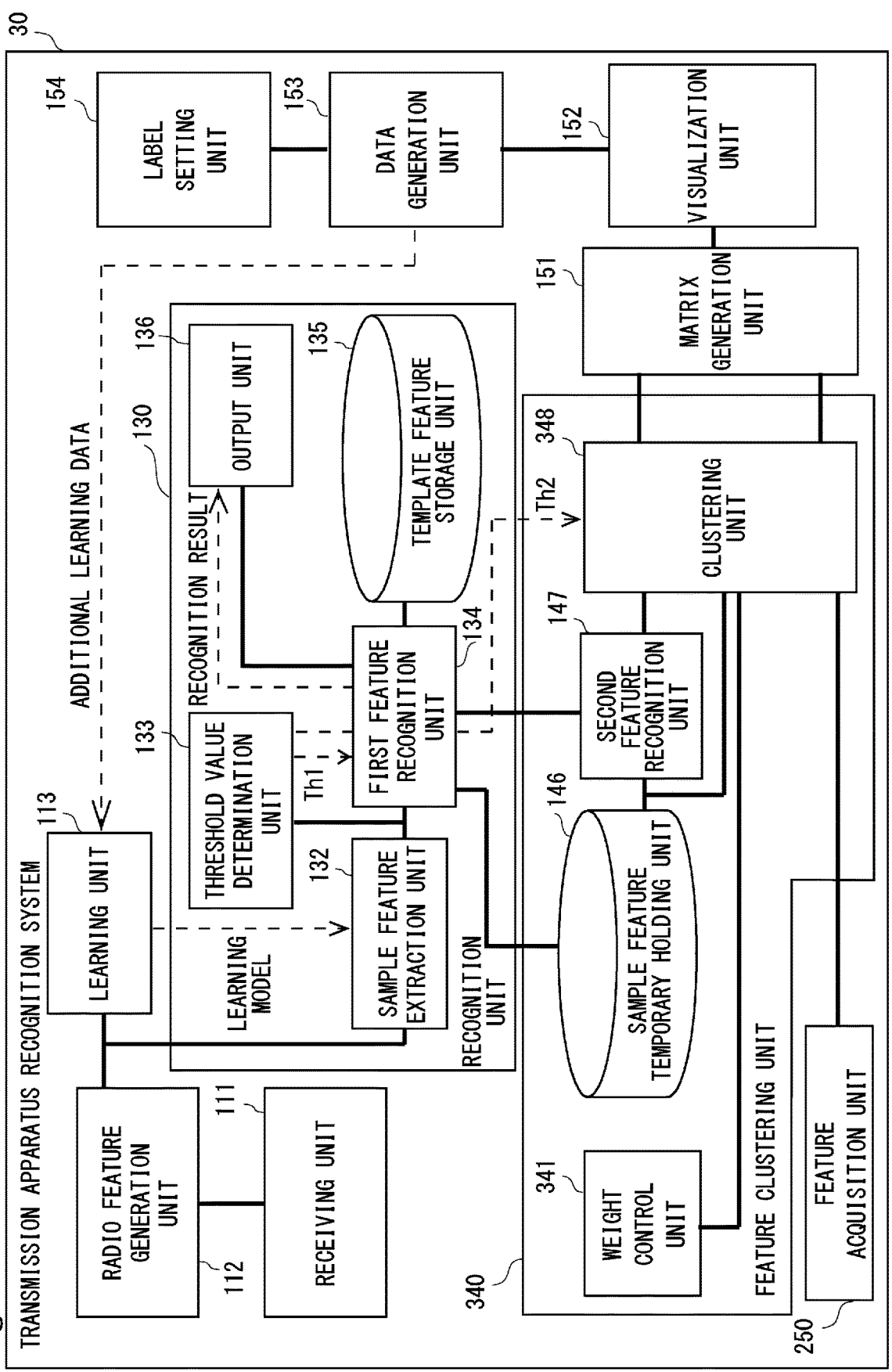
FIG. 14 is a block diagram illustrating an example of a functional configuration of a transmission apparatus recognition system according to a fourth example embodiment.

A fourth example embodiment will be described focusing on difference from the second example embodiment with reference to FIG. 14. However, in the fourth example embodiment as well, various examples described in the first to third example embodiments can be applied as long as they do not result in conflicting processing. FIG. 14 is a block diagram illustrating an example of a functional configuration of a transmission apparatus recognition system according to the fourth example embodiment. Note that, components illustrated in FIG. 14, those having the same names as those of the components described in FIGS. 5 and 13, basically have a similar function, and description of the similar function is omitted except for a part.

In a transmission apparatus recognition system 30 (hereinafter, a present system 30) according to the present example embodiment illustrated in FIG. 14, information to be input is not in a form of a temporary label but in a form of a radio feature before temporary labeling. Then, in the present system 30, standardization (normalization) is performed on a radio feature before temporary labeling, or on an extracted sample feature and the radio feature before temporary labeling. Then, in the present system 30, the radio feature before temporary labeling after normalization is performed clustering together with a sample feature for recognition, and a relationship matrix is generated. In the present example embodiment, information being equivalent to the temporary label is estimated by clustering from the radio feature before temporary labeling, and it can be said that the present system 30 includes an estimation apparatus.

Therefore, in a transmission apparatus recognition system 10, the present system 30 includes a feature acquisition unit 250 and a part of a function of a feature clustering unit 340 instead of a temporary label acquisition unit 150, and also includes a function of the feature clustering unit 340 other than the above-described part instead of a feature clustering unit 140.

The feature clustering unit 340 includes a sample feature temporary holding unit 146, a second feature recognition unit 147, a weight control unit 341, and a clustering unit 348. In the feature clustering unit 340, a function of the clustering unit 348 other than the above-described part is one example of a first clustering unit 1c in FIGS. 1 to 3.

The feature acquisition unit 250 and the above-described part of the function of the clustering unit 348 are examples of an estimation information acquisition unit 1d in FIGS. 1 to 3.

The feature acquisition unit 250 inputs m radio features as m pieces of estimation target information. Then, the clustering unit 348 performs third clustering processing on the m radio features as a part of the function, and acquires M pieces of estimation information as a result of the processing (hereinafter, a temporary label clustering result).

The clustering unit 348 outputs information including M temporary labels indicating each of M transmission terminals as M pieces of estimation information. The temporary label of the present example embodiment differs from a temporary label of the second example embodiment in a generation procedure, but can be said to basically have the same meaning. The clustering unit 348 can assign a temporary label to each of clusters as result of performing the third clustering processing on the m radio features. For example, the clustering unit 348 can assign five temporary labels when the m radio features are classified into five clusters. In other words, the clustering unit 348 can output a temporary label instead of a cluster number, or output an object in which a predetermined sign is attached to the cluster number as a temporary label, in response to an input from the feature acquisition unit 250.

In addition, the clustering unit 348 can also output the estimation information in such a way as to include temporary label reliability information about the temporary label. Therefore, in the present example embodiment, the feature acquisition unit 250 can acquire reliability information of a radio feature in association with each of the m radio features. The clustering unit 348 can generate temporary label reliability information for one or a plurality of radio features included in each cluster as a result of performing the third clustering processing on the radio feature, that is, for one or a plurality of radio features to which each temporary label is assigned.

The temporary label reliability information can be generated based on reliability information acquired by the feature acquisition unit 250. For example, when four radio features are included in a certain temporary label, the clustering unit 348 can calculate temporary label reliability information for the temporary label by performing statistical processing such as averaging or median calculation on the reliability information associated with the four radio features. Then, the clustering unit 348 can output the temporary label reliability information in association with the temporary label at a time of outputting the temporary label.

Further, the clustering unit 348 performs first clustering processing on a sample feature output from a sample feature extraction unit 132 and a radio feature acquired by the feature acquisition unit 250, and acquires a first clustering result. In other words, the clustering unit 348 can output both the temporary label clustering result and the first clustering result, and both clustering for acquiring the results can be performed at one time or at different timings.

However, in the first clustering processing and the third clustering processing according to the present example embodiment, standardization (normalization) is performed by the weight control unit 341 on the radio feature before temporary labeling and the extracted sample feature. Prior to describing the temporary label clustering result, the weight control unit 341 will be described.

The weight control unit 341 performs weight control processing (normalization processing or weighting processing) on n sample features, which are results extracted by the sample feature extraction unit 132, and m radio features input as m pieces of estimation target information by the feature acquisition unit 250. The normalization processing is processing known as a function such as a standard scaler or a Min-Max scaler, and is processing for removing influence of a measurement unit in both pieces of processing on a size of data as input data of the first clustering processing or the third clustering processing. In other words, the weight control processing is processing in which the clustering unit 348 performs normalization (standardization) in such a way that both features can be handled as values having the same maximum value or the like and performed clustering, and then performs weighting on one of both features. The normalization processing is also referred to as standardization processing. The weight control unit 341 can perform, for example, control of changing the weighting between the sample feature and the m radio features in the normalization processing.

However, there may be a case where a radio feature output from an estimation apparatus and a sample feature output from the sample feature extraction unit 132 do not need to be subjected to the normalization processing originally. Therefore, in such a case, since the normalization processing is unnecessary, it can be said that a configuration without the weight control unit 341 can be adopted in the present example embodiment.

As described above, the clustering unit 348 performs the first clustering processing on n sample features and m radio features to which the weight control processing is applied, and performs the third clustering processing on the m radio features. Note that, as described in the first example embodiment, the m radio features are information used to generate learning data, an apparatus with high estimation accuracy can be used as the estimation apparatus, and in a case where the estimation accuracy is high, the number indicated by n coincides with the number indicated by m. Therefore, in this case, the clustering unit 348 performs the first clustering processing on the n sample features to which the weight control processing is applied and the m radio features associating thereof, and performs the third clustering processing on the m radio features.

In addition, the third clustering processing can be processing that the number of dimensions of an input node and an output node are changed in the same algorithm as the first clustering processing, but a clustering threshold value can be changed. Although the first clustering processing and the third clustering processing are described as being distinguished from each other, they can be performed as one clustering processing. The first clustering processing and the third clustering processing according to the present example embodiment can use various algorithms exemplified as the algorithms of the first clustering processing according to the second example embodiment. The first clustering processing according to the present example embodiment is basically similar to the first clustering processing according to the second example embodiment as comparison, although the number of input dimensions increases by the number of dimensions of the radio feature. Note that, since the number of output dimensions (the number of clusters) varies depending on the clustering result, it is difficult to compare with the second example embodiment, but there is a possibility that the number of output dimensions increase because the number of input dimensions increases as compared with that of the second example embodiment.

Then, the clustering unit 348 can output the first clustering result and the temporary label in such a way as to distinguish a combined feature and a single feature from each other, as a result of performing the first and third clustering processing on the n sample features and the m radio features to which the weight control processing is applied. In a case of outputting the clustering result in the clustering unit 348, for example, a cluster indicated by the first clustering result and a cluster indicated by the temporary label on the same graph can be output in such a way that they can be distinguished from each other.

The clustering unit 348 may perform the first and third clustering processing on the n sample features and the m radio feature to which the weight control processing is applied, and output the results in such a way that each of clustering results can be discriminated. For example, the clustering unit 348 can output two types of data, which are the first clustering result based on both features (combined features), and a temporary label based on a temporary label clustering result (third clustering result). For this purpose, the clustering unit 348 performs the first and third clustering processing on the n sample features and the m radio features to which the weight control processing is applied, acquires the result (clustering result having a large data amount), and acquires the following result. In other words, the clustering unit 348 acquires a clustering result having a large data amount, and also acquires a result of performing the third clustering processing only on the m radio features to which the weight control processing is applied. The above result is clustering result having a small data amount.

However, even in a case where the normalization processing or the weighting processing is performed on a feature as a base from which the large clustering result data is acquired, the normalization processing or the weighting processing may not be performed on the m radio features for acquiring the small clustering result data. As a result, for example, when a clustering result is displayed in a graph, there is a high possibility that small clustering result data is displayed in such a way as to be easily distinguished from large clustering result data.

In addition, the clustering unit 348 according to the present example embodiment can output information indicating at least one of a sample feature for each cluster and an inter-cluster distance of each sample feature, and add the output information to a relationship matrix. Further, the clustering unit 348 can also output information indicating at least one of a radio feature for each cluster (the radio feature acquired by the feature acquisition unit 250) and an inter-cluster distance of each radio feature, and add the output information to the relationship matrix.

In addition, in the present example embodiment, a clustering threshold value Th2 can also include a clustering threshold value Th2-1 for clustering a radio feature acquired by the feature acquisition unit 250 and a clustering threshold value Th2-2 for clustering a sample feature. Alternatively, in the example of acquiring the clustering result having a large data amount and the clustering result having a small data amount, the clustering threshold value Th2 can include the clustering threshold value Th2-1 for acquiring the former result and the clustering threshold value Th2-2 for acquiring the latter result. In addition, according to the present example embodiment, similarly to the second example embodiment, a configuration in which the clustering threshold value Th2 cannot be changed is not excluded.

A matrix generation unit 151 in the present system 30 generates a relationship matrix, based on a clustering result output from the clustering unit 348. Specifically, the matrix generation unit 151 generates a relationship matrix, based on a temporary label or the temporary label and temporary label reliability information, and the first clustering result for both features (combined features).

Each of units performing processing at a subsequent stage of the matrix generation unit 151 is basically similar to those of the transmission apparatus recognition system 10 in FIG. 5. Briefly described that, in the present system 30, a correct answer label is set by an operator, based on a relationship matrix, and additional learning data about the correct answer label is generated. In addition, a display example of the clustering result and a display example of the relationship matrix can be applied to those exemplified in the second example embodiment.

According to the present example embodiment, in addition to the effect of the second example embodiment, even when there is no function of assigning a temporary label in the estimation apparatus, or even when the temporary label assigned in the estimation apparatus is difficult to be applied because it does not meet a criterion of the present system 30, the temporary label can be assigned in the present system 30. In addition, it is possible to visualize a relationship of the clustering result of the feature when the sample feature and the radio feature are combined, with respect to the clustering result by the radio feature being equivalent to the temporary label to be assigned. Further, a change and a trend in the relationship based on change in weighting can also be visualized. Therefore, according to the present example embodiment, in addition to the effect of the second example embodiment, it can be said that versatility of an apparatus which can be adopted as the estimation apparatus can be improved.

In addition, in the present system 30, since it is possible to know whether the number of clusters changes or the like by making the clustering threshold value Th2-1 variable, it is possible for an operator to confirm reliability of a first clustering result and set a correct answer label with high reliability. In addition, by also making the clustering threshold value Th2-2 variable, it becomes possible to set a correct answer label with higher reliability. In addition, it is also possible that a computer recognizes whether the number of clusters of the temporary label is changed by automatically raising or lowering for at least one of the clustering threshold value Th2-1 and the clustering threshold value Th2-2, and an appropriate threshold value is automatically set.

In addition, in the present example embodiment, the present system 30, that is, one example of the transmission apparatus recognition system has been described, but the present example embodiment can also be implemented as one example of a learning data generation system in FIG. 1 or one example of a learning system 2 in FIG. 2.

Other Embodiments

As described above with respect to the processing in the first to fourth example embodiments, the present disclosure may also adopt a form as a learning data generation method, a form as a learning method, and a form as a transmission apparatus recognition method.

In addition, with respect to the systems according to the first to fourth example embodiments, the configuration examples of each unit which is a component thereof have been described, but a function of each unit needs only to be achieved, and is not limited to the illustrated configuration examples. For example, in the configuration example in FIG. 5, it is only necessary to have a function necessary when the entire system is viewed, such as a function that can change in such a way as to include a radio feature generation unit in a recognition unit.

Figure 15:
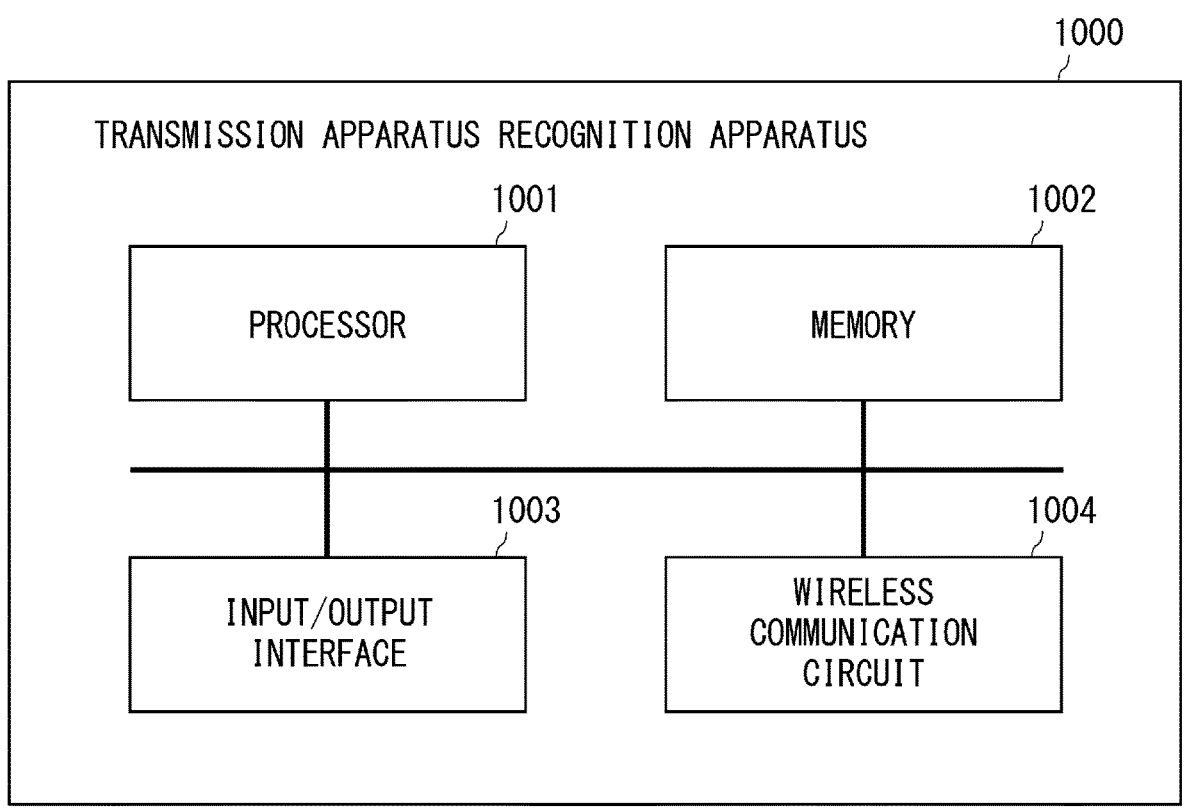
FIG. 15 is a diagram illustrating one example of a hardware configuration included in an apparatus.

In addition, the system according to the first to fourth example embodiments or each of apparatuses constituting the system can have the following hardware configuration. FIG. 15 is a diagram illustrating one example of a hardware configuration included in an apparatus.

A apparatus 1000 illustrated in FIG. 15 can be the learning data generation system, the learning system, or the transmission apparatus recognition system according to the first to fourth example embodiments, or each apparatus constituting the systems. The apparatus 1000 can be configured by an information processing apparatus, (a so-called computer), and includes, for example, a processor 1001, a memory 1002, an input/output interface 1003, a wireless communication circuit 1004, and the like. Note that, a wired communication circuit can be included in addition to the wireless communication circuit 1004. Components such as the processor 1001 described above are connected with each other by an internal bus or the like, and are configured to be communicable with each other.

The processor 1001 is a programmable device such as a central processing unit (CPU), a micro processing unit (MPU), a digital signal processor (DSP), or a GPU. Alternatively, the processor 1001 may be a device such as a field programmable gate array (FPGA), or an application specific integrated circuit (ASIC). The processor 1001 can execute various programs including an operating system (OS).

The memory 1002 is a storage apparatus such as a random access memory (RAM), a read only memory (ROM), a hard disk drive (HDD), a solid state drive (SSD), or a memory card. The memory 1002 stores an OS program, an application program, and various pieces of data.

The input/output interface 1003 is an interface for a display apparatus or an input apparatus not being illustrated. The display apparatus is, for example, a liquid crystal display, an organic electroluminescence display, a printer, or the like. The input apparatus is, for example, an apparatus that accepts a user operation such as a keyboard, a mouse, or a touch panel.

The wireless communication circuit 1004 is a circuit, a module, or the like that performs wireless communication with another apparatus. For example, the wireless communication circuit 1004 includes a radio frequency (RF) circuit and the like. Note that, part or all of the apparatus 1000 can be achieved by one or a plurality of integrated circuits. In addition, the apparatus 1000 may be achieved by being divided into one or a plurality of components, and for example, each of the components of the apparatus 1000 such as the processor 1001 and the memory 1002 may also be achieved by being divided into one or a plurality of components.

A function of the apparatus 1000 as the learning data generation system, the learning system, the transmission apparatus recognition system, or each apparatus constituting the systems can be achieved by various processing modules. The processing module is achieved, for example, by the processor 1001 executing a program stored in the memory 1002. The program in this case can refer to a learning data generation program, a learning program, or a transmission apparatus recognition program. Further, the processing module described above can be achieved by a semiconductor chip.

The each of the programs includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage apparatuses. The program may be transmitted on a transitory computer readable medium or a communication medium. By way of example, and not a limitation, transitory computer readable media or communication media can include electrical, optical, acoustical, or other forms of propagated signals.

Note that, the present disclosure is not limited to the above-described example embodiments, and can be appropriately changed within a range not deviating from the gist. In addition, the present disclosure may be achieved by appropriately combining each of the example embodiments.

According to the present disclosure, a learning data generation system, a learning system, a learning data generation method, a learning method, and a program that are capable of improving recognition accuracy in processing of recognizing an unknown transmission apparatus, based on a signal wirelessly transmitted from the transmission apparatus can be provided. Note that, according to the present disclosure, another effect may be provided in place of or in addition to such effects.

The first to forth example embodiments can be combined as desirable by one of ordinary skill in the art.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

The whole or part of the exemplary embodiments disclosed above can be described as, but not limited to, the following supplementary notes.

(Supplementary Note 1)

A learning data generation system including:

an input unit configured to input, by taking N and n as positive integers, n pieces of first information, which are either n unknown signals being signals wirelessly transmitted from N unknown transmission apparatuses or n unknown radio features being radio features generated from the n unknown signals;

an extract unit configured to input the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extract n sample features corresponding to each of the n pieces of first information;

a first clustering unit configured to perform first clustering processing on the n sample features that are results being extracted by the extraction unit;

an estimation information acquisition unit configured to input, by taking M and m as positive integers, m pieces of estimation target information to be estimated with respect to the n unknown signals or the n unknown radio features by an estimation apparatus that performs processing different from the first clustering processing, and acquire M pieces of estimation information associated with any one of the n unknown signals or any one of the n unknown radio features; and a generation unit configured to generate, by taking K as a positive integer, a relationship matrix indicating a relationship between a first clustering result indicating a result classified into K groups by the first clustering processing and the M pieces of estimation information.

(Supplementary Note 2)

The learning data generation system according to supplementary note 1, wherein the estimation information acquisition unit inputs m radio features or signals as the m pieces of estimation target information, and also inputs the M pieces of estimation information associated with the m radio features or signals, and the M pieces of estimation information include M temporary labels indicating each of M transmission apparatuses.

(Supplementary Note 3)

The learning data generation system according to supplementary note 1, wherein the estimation information acquisition unit includes a second clustering unit configured to input m radio features as the m pieces of estimation target information, perform second clustering processing on the m radio features, and acquire the M pieces of estimation information, and the M pieces of estimation information include M temporary labels indicating each of M transmission apparatuses.

(Supplementary Note 4)

The learning data generation system according to supplementary note 1, wherein the first clustering unit performs weight control processing on the n sample features being a result of extraction by the extraction unit and m radio features being input as the m pieces of estimation target information by the estimation information acquisition unit, and performs the first clustering processing on the n sample features and the m radio features to which the weight control processing is applied, the estimation information acquisition unit inputs the m radio features as the m pieces of estimation target information, and acquires the M pieces of estimation information as a result of the first clustering processing, and the M pieces of estimation information include M temporary labels indicating each of M transmission apparatuses.

(Supplementary Note 5)

The learning data generation system according to any one of supplementary notes 2 to 4, wherein the estimation information includes temporary label reliability information indicating reliability of the temporary label and being associated with the temporary label, and the relationship matrix is generated in a state where the temporary label reliability information is associated with the temporary label.

(Supplementary Note 6)

The learning data generation system according to any one of supplementary notes 1 to 5, wherein the first clustering unit performs the first clustering processing for a plurality of times with different clustering threshold values, and acquires a plurality of times of first clustering results, and the generation unit generates the relationship matrix for each of the plurality of times of first clustering results.

(Supplementary Note 7)

The learning data generation system according to any one of supplementary notes 1 to 6, further including a recognition unit, wherein the input unit inputs, as information including the first information, third information which is either a signal wirelessly transmitted from a plurality of any transmission apparatuses or a radio feature generated from the signal, the extraction unit inputs the third information to the learning model, and extracts a sample feature for the third information, the recognition unit recognizes a sample feature of the third information with a template feature registered in advance, and the first clustering unit performs the first clustering processing on a sample feature determined to be unknown or unregistered by the recognition unit as the n sample features.

(Supplementary Note 8)

The learning data generation system according to supplementary note 7, further including a template feature registration unit configured to generate and register a template feature from a sample feature determined to be unknown or unregistered by the recognition unit.

(Supplementary Note 9)

The learning data generation system according to any one of supplementary notes 1 to 8, wherein the n unknown signals or the n unknown radio features that are input by the input unit are transmitted to the estimation apparatus, and the estimation information acquisition unit receives the m pieces of estimation target information from the estimation apparatus, and thereby inputs the m pieces of estimation target information.

(Supplementary Note 10)

The learning data generation system according to any one of supplementary notes 1 to 9, further including a display unit configured to display the relationship matrix, or the relationship matrix and the first clustering result.

(Supplementary Note 11)

The learning data generation system according to any one of supplementary notes 1 to 10, wherein information indicating at least one of a sample feature for each cluster and an inter-cluster distance of each sample feature is added to the relationship matrix.

(Supplementary Note 12)

The learning data generation system according to any one of supplementary notes 1 to 11, wherein the estimation information is information acquired by estimating, by the estimation apparatus, at least one of a position of each of M transmission apparatuses, a band of a radio transmission signal being a signal wirelessly transmitted by each of the M transmission apparatuses, a radio frequency or a radio frequency band of the radio transmission signal, a modulation scheme used by each of the M transmission apparatuses, a power value of the radio transmission signal, a frequency in which the radio transmission signal is transmitted, an occupancy rate of a time when the radio transmission signal is transmitted, a transmission packet length of the radio transmission signal, a data amount transmitted by the radio transmission signal, a radio frequency switching pattern in a case where the radio transmission signal is transmitted by a radio frequency hopping scheme, a spectrogram of the radio transmission signal, and a spectrum of the radio transmission signal.

(Supplementary Note 13)

The learning data generation system according to any one of supplementary notes 1 to 12, further including:

a label setting unit configured to set a correct answer label for at least some of intersection points of the relationship matrix; and a data generation unit configured to generate learning data for updating the learning model, based on an unknown signal or an unknown radio feature associated with each of the at least some intersection points and a correct answer label being set for each of the at least some intersection points.

(Supplementary Note 14)

A learning system including:
the learning data generation system according to supplementary note 13; and
a learning unit configured to perform machine learning, based on learning data generated by the learning data generation system, and learning data including the second information and a correct answer label associated with the second information, and update the learning model.

(Supplementary Note 15)

A learning data generation method including:
performing input processing of inputting, by taking N and n as positive integers, n pieces of first information, which are either n unknown signals being signals wirelessly transmitted from N unknown transmission apparatuses or n unknown radio features being radio features generated from the n unknown signals;
performing extraction processing of inputting the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extracting n sample features corresponding to each of the n pieces of first information;
performing first clustering processing on the n sample features that are results being extracted;
performing estimation information acquisition processing of inputting, by taking M and m as positive integers, m pieces of estimation target information to be estimated with respect to the n unknown signals or the n unknown radio features by an estimation apparatus that performs processing different from the first clustering processing, and acquiring M pieces of estimation information associated with any one of the n unknown signals or any one of the n unknown radio features; and
performing generation processing of generating, by taking K as a positive integer, a relationship matrix indicating a relationship between a first clustering result indicating a result classified into K groups by the first clustering processing and the M pieces of estimation information.

(Supplementary Note 16)

The learning data generation method according to supplementary note 15, further including inputting m radio features or signals as the m pieces of estimation target information, and also inputting the M pieces of estimation information associated with the m radio features or signals,
wherein the M pieces of estimation information include M temporary labels indicating each of M transmission apparatuses.

(Supplementary Note 17)

The learning data generation method according to supplementary note 15, wherein
the estimation information acquisition processing inputs m radio features as the m pieces of estimation target information, performs second clustering processing on the m radio features, and acquires the M pieces of estimation information, and
the M pieces of estimation information include M temporary labels indicating each of M transmission apparatuses.

(Supplementary Note 18)

The learning data generation method according to supplementary note 15, further including performing weight control processing on the n sample features being a result of extraction and m radio features being input as the m pieces of estimation target information, wherein
the first clustering processing performs clustering processing on the n sample features and the m radio features to which the weight control processing is applied,
the estimation information acquisition processing inputs the m radio features as the m pieces of estimation target information, and acquires the M pieces of estimation information as a result of the first clustering processing, and
the M pieces of estimation information include M temporary labels indicating each of M transmission apparatuses.

(Supplementary Note 19)

The learning data generation method according to any one of supplementary notes 16 to 18, wherein
the estimation information includes temporary label reliability information indicating reliability of the temporary label and being associated with the temporary label, and
the relationship matrix is generated in a state where the temporary label reliability information is associated with the temporary label.

(Supplementary Note 20)

The learning data generation method according to any one of supplementary notes 15 to 19, wherein
the first clustering processing is performed for a plurality of times with different clustering threshold values, and acquires a plurality of times of first clustering results, and
the generation processing generates the relationship matrix for each of the plurality of times of first clustering results.

(Supplementary Note 21)

The learning data generation method according to any one of supplementary notes 15 to 20, further including performing recognition processing, wherein
the input processing inputs, as information including the first information, third information, which is either a signal wirelessly transmitted from a plurality of any transmission apparatuses or a radio feature generated from the signal,
the extraction processing inputs the third information to the learning model, and extracts a sample feature for the third information,
the recognition processing recognizes a sample feature of the third information with a template feature registered in advance, and
the first clustering processing is performed on a sample feature determined to be unknown or unregistered by the recognition processing as the n sample features.

(Supplementary Note 22)

The learning data generation method according to supplementary note 21, further including generating and registering a template feature from a sample feature determined to be unknown or unregistered by the recognition processing.

(Supplementary Note 23)

The learning data generation method according to any one of supplementary notes 15 to 22, wherein the n unknown signals or the n unknown radio features that are input by the input processing are transmitted to the estimation apparatus, and the estimation information acquisition processing receives the m pieces of estimation target information from the estimation apparatus, and thereby inputs the m pieces of estimation target information.

(Supplementary Note 24)

The learning data generation method according to any one of supplementary notes 15 to 23, further including displaying, on a display apparatus, the relationship matrix, or the relationship matrix and the first clustering result.

(Supplementary Note 25)

The learning data generation method according to any one of supplementary notes 15 to 24, wherein information indicating at least one of a sample feature for each cluster and an inter-cluster distance of each sample feature is added to the relationship matrix.

(Supplementary Note 26)

The learning data generation method according to any one of supplementary notes 15 to 25, wherein the estimation information is information acquired by estimating, by the estimation apparatus, at least one of a position of each of M transmission apparatuses, a band of a radio transmission signal being a signal wirelessly transmitted by each of the M transmission apparatuses, a radio frequency or a radio frequency band of the radio transmission signal, a modulation scheme used by each of the M transmission apparatuses, a power value of the radio transmission signal, a frequency in which the radio transmission signal is transmitted, an occupancy rate of a time when the radio transmission signal is transmitted, a transmission packet length of the radio transmission signal, a data amount transmitted by the radio transmission signal, a radio frequency switching pattern in a case where the radio transmission signal is transmitted by a radio frequency hopping scheme, a spectrogram of the radio transmission signal, and a spectrum of the radio transmission signal.

(Supplementary Note 27)

The learning data generation method according to any one of supplementary notes 15 to 26, further including:
setting a correct answer label for at least some of intersection points of the relationship matrix; and
generating learning data for updating the learning model, based on an unknown signal or unknown radio feature associated with each of the at least some intersection points and a correct answer label being set for each of the at least some intersection points.

(Supplementary Note 28)

A learning method including performing machine learning, based on learning data generated by the learning data generation method according to supplementary note 27, and learning data including the second information and a correct answer label associated with the second information, and updating the learning model.

(Supplementary Note 29)

A learning data generation method including:
inputting first information being an unknown radio signal or an unknown radio feature generated from the unknown radio signal;
inputting the first information to a supervised learning model generated from learning data including second information being a known radio signal or a known radio feature generated from the known radio signal, and a correct answer label associated with the second information, and extracting a sample feature corresponding to each of pieces of the first information;

performing first clustering processing on the extracted sample feature;
outputting estimation information associated with the unknown radio signal or the unknown radio feature by processing different from the first clustering processing; and
generating a relationship matrix indicating a relationship between a first clustering result indicating a result classified into a group by the first clustering processing and the estimation information.

(Supplementary Note 30)

A program for causing a computer to execute learning data generation processing, the learning data generation processing including:
performing input processing of inputting, by taking N and n as positive integers, n pieces of first information, which are either n unknown signals being signals wirelessly transmitted from N unknown transmission apparatuses or n unknown radio features being radio features generated from the n unknown signals;
performing extraction processing of inputting the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extracting n sample features corresponding to each of the n pieces of first information;
performing first clustering processing on the n sample features that are results being extracted;
performing estimation information acquisition processing of inputting, by taking M and m as positive integers, m pieces of estimation target information to be estimated with respect to the n unknown signals or the n unknown radio features by an estimation apparatus that performs processing different from the first clustering processing, and acquiring M pieces of estimation information associated with any one of the n unknown signals or any one of the n unknown radio features; and
performing generation processing of generating, by taking K as a positive integer, a relationship matrix indicating a relationship between a first clustering result indicating a result classified into K groups by the first clustering processing and the M pieces of estimation information.

What is claimed is:

1. A learning data generation system comprising a processor and:
an inputter configured to input by the processor, by taking N and n as positive integers, n pieces of first information, which are either n unknown signals being signals wirelessly transmitted from N unknown transmission apparatuses or n unknown radio features being radio features generated from the n unknown signals;
an extractor configured to input by the processor the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extract n sample features corresponding to each of the n pieces of first information;

a first cluster analyzer configured to perform by the processor first clustering processing on the n sample features that are results being extracted by the extractor; and a generator configured to input by the processor, by taking M and m as positive integers, m pieces of estimation target information to be estimated with respect to the n unknown signals or the n unknown radio features by an estimation apparatus that performs processing different from the first clustering processing, acquire M pieces of estimation information associated with any one of the n unknown signals or any one of the n unknown radio features, and generate, by taking K as a positive integer, a relationship matrix indicating a relationship between a first clustering result indicating a result classified into K groups by the first clustering processing and the M pieces of estimation information, wherein the estimation information is information acquired by estimating, by the estimation apparatus, at least one of a position of each of M transmission apparatuses, a band of a radio transmission signal being a signal wirelessly transmitted by each of the M transmission apparatuses, a radio frequency or a radio frequency band of the radio transmission signal, a modulation scheme used by each of the M transmission apparatuses, a power value of the radio transmission signal, a frequency in which the radio transmission signal is transmitted, an occupancy rate of a time when the radio transmission signal is transmitted, a transmission packet length of the radio transmission signal, a data amount transmitted by the radio transmission signal, a radio frequency switching pattern in a case where the radio transmission signal is transmitted by a radio frequency hopping scheme, a spectrogram of the radio transmission signal, a spectrum of the radio transmission signal;

wherein an intersection point in the relationship matrix is used in correctly labeling an unknown signal from the n unknown signals.

2. The learning data generation system according to claim 1, wherein;

the generator inputs m radio features or signals as the m pieces of estimation target information, and also inputs the M pieces of estimation information associated with the m radio features or signals, and the M pieces of estimation information include M temporary labels indicating each of M transmission apparatuses.

3. The learning data generation system according to claim 1, wherein:

the generator includes second cluster analyzer configured to input m radio features as the m pieces of estimation target information, perform second clustering processing on the m radio features, and acquire the M pieces of estimation information, and the M pieces of estimation information include M temporary labels indicating each of M transmission apparatuses.

4. The learning data generation system according to claim 1, wherein:

the first cluster analyzer performs weight control processing on the n sample features being a result of extraction by the extractor and m radio features being input as the m pieces of estimation target information by the generator, and performs the first clustering processing on the n sample features and the m radio features to which the weight control processing is applied, the generator inputs the m radio features as the m pieces of estimation target information, and acquires the M pieces of estimation information as a result of the first clustering processing, and the M pieces of estimation information include M temporary labels indicating each of M transmission apparatuses.

5. The learning data generation system according to claim 2, wherein;

the estimation information includes temporary label reliability information indicating reliability of the temporary label and being associated with the temporary label, and the relationship matrix is generated in a state where the temporary label reliability information is associated with the temporary label.

6. The learning data generation system according to claim 1, wherein:

the first cluster analyzer performs the first clustering processing for a plurality of times with different clustering threshold values, and acquires a plurality of times of first clustering results, and the generator generates the relationship matrix for each of the plurality of times of first clustering results.

7. The learning data generation system according to claim 1, further comprising a recognizer, wherein:

the inputter inputs, as information including the first information, third information, which is either a signal wirelessly transmitted from a plurality of any transmission apparatuses or a radio feature generated from the signal, the extractor inputs the third information to the learning model, and extracts a sample feature for the third information, the recognizer recognizes a sample feature of the third information with a template feature registered in advance, and the first cluster analyzer performs the first clustering processing on a sample feature determined to be unknown or unregistered by the recognizer as the n sample features.

8. The learning data generation system according to claim 7, further comprising a template feature register configured to generate and register a template feature from a sample feature determined to be unknown or unregistered by the recognizer.

9. The learning data generation system according to claim 1, wherein:

the n unknown signals or the n unknown radio features that are input by the inputter are transmitted to the estimation apparatus, and the generator receives the m pieces of estimation target information from the estimation apparatus, and thereby inputs the m pieces of estimation target information.

10. The learning data generation system according to claim 1, further comprising a display configured to display the relationship matrix, or the relationship matrix and the first clustering result.

11. The learning data generation system according to claim 1, wherein information indicating at least one of a sample feature for each cluster and an inter-cluster distance of each sample feature is added to the relationship matrix.

12. The learning data generation system according to claim 1, further comprising:

a label setter configured by the processor to set a correct answer label for at least some of intersection points of the relationship matrix; and a data generator configured by the processor to generate learning data for updating the learning model, based on an unknown signal or unknown radio feature associated with each of the at least some intersection points and a correct answer label being set for each of the at least some intersection points.

13. A learning data generation method comprising:

performing input processing of inputting, by taking N and n as positive integers, n pieces of first information, which are either n unknown signals being signals wirelessly transmitted from N unknown transmission apparatuses or n unknown radio features being radio features generated from the n unknown signals;

performing extraction processing of inputting the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extracting n sample features corresponding to each of the n pieces of first information;

performing first clustering processing on the n sample features that are results being extracted;

performing estimation information acquisition processing of inputting, by taking M and m as positive integers, m pieces of estimation target information to be estimated with respect to the n unknown signals or the n unknown radio features by an estimation apparatus that performs processing different from the first clustering processing, and acquiring M pieces of estimation information associated with any one of the n unknown signals or any one of the n unknown radio features; and performing generation processing of generating, by taking K as a positive integer, a relationship matrix indicating a relationship between a first clustering result indicating a result classified into K groups by the first clustering processing and the M pieces of estimation information, wherein the estimation information is information acquired by estimating, by the estimation apparatus, at least one of a position of each of M transmission apparatuses, a band of a radio transmission signal being a signal wirelessly transmitted by each of the M transmission apparatuses, a radio frequency or a radio frequency band of the radio transmission signal, a modulation scheme used by each of the M transmission apparatuses, a power value of the radio transmission signal, a frequency in which the radio transmission signal is transmitted, an occupancy rate of a time when the radio transmission signal is transmitted, a transmission packet length of the radio transmission signal, a data amount transmitted by the radio transmission signal, a radio frequency switching pattern in a case where the radio transmission signal is transmitted by a radio frequency hopping scheme, a spectrogram of the radio transmission signal, a spectrum of the radio transmission signal;

wherein an intersection point in the relationship matrix is used in correctly labeling an unknown signal from the n unknown signals.

14. The learning data generation method according to claim 13, further comprising inputting m radio features or signals as the m pieces of estimation target information, and also inputting the M pieces of estimation information associated with the m radio features or signals, wherein the M pieces of estimation information include M temporary labels indicating each of M transmission apparatuses.

15. The learning data generation method according to claim 13, wherein:

the estimation information acquisition processing inputs m radio features as the m pieces of estimation target information, performs second clustering processing on the m radio features, and acquires the M pieces of estimation information, and the M pieces of estimation information include M temporary labels indicating each of M transmission apparatuses.

16. The learning data generation method according to claim 13, further comprising performing weight control processing on the n sample features being a result of extraction and m radio features being input as the m pieces of estimation target information, wherein:

the first clustering processing performs clustering processing on the n sample features and the m radio features to which the weight control processing is applied, the estimation information acquisition processing inputs the m radio features as the m pieces of estimation target information, and acquires the M pieces of estimation information as a result of the first clustering processing, and the M pieces of estimation information include M temporary labels indicating each of M transmission apparatuses.

17. The learning data generation method according to claim 13, wherein:

the first clustering processing is performed for a plurality of times with different clustering threshold values, and acquires a plurality of times of first clustering results, and the generation processing generates the relationship matrix for each of the plurality of times of first clustering results.

18. The learning data generation method according to claim 13, further comprising performing recognition processing, wherein:

the input processing inputs, as information including the first information, third information, which is either a signal wirelessly transmitted from a plurality of any transmission apparatuses or a radio feature generated from the signal, the extraction processing inputs the third information to the learning model, and extracts a sample feature for the third information, the recognition processing recognizes a sample feature of the third information with a template feature registered in advance, and the first clustering processing is performed on a sample feature determined to be unknown or unregistered by the recognition processing as the n sample features.

19. A non-transitory computer readable medium storing a program for causing a computer to execute learning data generation processing, the learning data generation processing comprising:

performing input processing of inputting, by taking N and n as positive integers, n pieces of first information, which are either n unknown signals being signals wirelessly transmitted from N unknown transmission apparatuses or n unknown radio features being radio features generated from the n unknown signals;

performing extraction processing of inputting the n pieces of first information to a supervised learning model being generated from learning data including second information, which is either a known signal being a signal wirelessly transmitted from a transmission apparatus whose transmission source is known or a known radio feature being a radio feature generated from the known signal, and a correct answer label being associated with the second information, and extracting n sample features corresponding to each of the n pieces of first information;

performing first clustering processing on the n sample features that are results being extracted;

performing estimation information acquisition processing of inputting, by taking M and m as positive integers, m pieces of estimation target information to be estimated with respect to the n unknown signals or the n unknown radio features by an estimation apparatus that performs processing different from the first clustering processing, and acquiring M pieces of estimation information associated with any one of the n unknown signals or any one of the n unknown radio features; and performing generation processing of generating, by taking K as a positive integer, a relationship matrix indicating a relationship between a first clustering result indicating a result classified into K groups by the first clustering processing and the M pieces of estimation information, wherein the estimation information is information acquired by estimating, by the estimation apparatus, at least one of a position of each of M transmission apparatuses, a band of a radio transmission signal being a signal wirelessly transmitted by each of the M transmission apparatuses, a radio frequency or a radio frequency band of the radio transmission signal, a modulation scheme used by each of the M transmission apparatuses, a power value of the radio transmission signal, a frequency in which the radio transmission signal is transmitted, an occupancy rate of a time when the radio transmission signal is transmitted, a transmission packet length of the radio transmission signal, a data amount transmitted by the radio transmission signal, a radio frequency switching pattern in a case where the radio transmission signal is transmitted by a radio frequency hopping scheme, a spectrogram of the radio transmission signal, a spectrum of the radio transmission signal;

wherein an intersection point in the relationship matrix is used in correctly labeling an unknown signal from the n unknown signals.

\* \* \* \* \*